United States Patent
Iguchi

(10) Patent No.: US 12,519,810 B2
(45) Date of Patent: Jan. 6, 2026

(54) SECURITY APPARATUS, SECURITY METHOD, AND RECORDING MEDIUM

(71) Applicant: Panasonic Intellectual Property Management Co., Ltd., Osaka (JP)

(72) Inventor: Akihiko Iguchi, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 290 days.

(21) Appl. No.: 18/526,396

(22) Filed: Dec. 1, 2023

(65) Prior Publication Data

US 2024/0195822 A1  Jun. 13, 2024

(30) Foreign Application Priority Data

Dec. 7, 2022  (JP) ................................. 2022-195467

(51) Int. Cl.
  *B60W 30/00* (2006.01)
  *B60R 25/00* (2013.01)
  *G06F 21/55* (2013.01)
  *H04L 9/40* (2022.01)
  *H04L 67/12* (2022.01)

(52) U.S. Cl.
  CPC ...... *H04L 63/1416* (2013.01); *H04L 63/1441* (2013.01); *H04L 67/12* (2013.01)

(58) Field of Classification Search
  None
  See application file for complete search history.

(56) References Cited

U.S. PATENT DOCUMENTS

| | | | | |
|---|---|---|---|---|
| 11,838,302 | B2* | 12/2023 | Stuck | H04L 63/1416 |
| 2019/0356685 | A1* | 11/2019 | Naserian | H04W 4/40 |
| 2019/0367041 | A1* | 12/2019 | Nakano | G06F 21/554 |
| 2020/0216027 | A1* | 7/2020 | Deng | H04L 63/1416 |
| 2020/0283002 | A1* | 9/2020 | Gupta | G08G 1/096741 |
| 2020/0326200 | A1 | 10/2020 | Mizoguchi et al. | |
| 2021/0237665 | A1 | 8/2021 | Tamura et al. | |
| 2024/0140448 | A1* | 5/2024 | Kasuya | B60W 50/04 |

FOREIGN PATENT DOCUMENTS

| | | | |
|---|---|---|---|
| JP | S62-1658 A | 1/1987 | |
| JP | 2006-027356 | 2/2006 | |
| JP | 2017-007399 | 1/2017 | |
| JP | 2019-125344 | 7/2019 | |
| JP | 2019-219709 | 12/2019 | |
| JP | 2020-173133 | 10/2020 | |
| WO | WO-2019239658 A1 * | 12/2019 | ............. G08B 21/00 |
| WO | 2021/019635 | 2/2021 | |
| WO | WO-2022239420 A1 * | 11/2022 | ............. G08B 25/08 |

OTHER PUBLICATIONS

Notice of Reasons for Refusal for Japanese Patent App. No. 2022-195467, dated Oct. 15, 2024, with English translation.

\* cited by examiner

*Primary Examiner* — Christopher B Robinson
(74) *Attorney, Agent, or Firm* — Greenblum & Bernstein, P.L.C.

(57) ABSTRACT

A security apparatus includes a boarding determiner that determines whether a user is allowed or prohibited to board a vehicle when the vehicle receives a cyberattack while the user is not on board the vehicle, and a notification processor that notifies a terminal apparatus of a result of determination by the boarding determiner, the terminal apparatus being located outside the vehicle and used by the user.

20 Claims, 16 Drawing Sheets

FIG. 5

117 — Second account device — a1

User information

| User ID | Name | Address | Telephone number | E-mail address | Vehicle ID | Position | Relationship |
|---|---|---|---|---|---|---|---|
| AAA | OOO | △△△ | □□□ | CCCC | EEE | FFF | Contractor |
| BBB | ●●● | ▲▲▲ | ■■■ | DDDD | EEE | GGG | Family |

Vehicle information — a2

| Vehicle ID | Vehicle name | Vehicle number | Parking position | IP address |
|---|---|---|---|---|
| EEE | WWW | XXXX | YYY | ZZZ |

Contact information — a3

| ID | Company name | Address | Location | Telephone number | E-mail address | URL |
|---|---|---|---|---|---|---|
| SE-001 | OO Security center | HHH | III | JJJ | KKK | LLL |
| SE-002 | △△ Police station | MMM | NNN | OOO | PPP | QQQ |

Notification method information (b1)

| Notification ID | Content of notification method |
|---|---|
| ID-000 | Normal notification |
| ID-001 | Notify by increasing sound and vibration when user approaches vehicle within a predetermined distance, and stop by answerback |
| ID-002 | Notify terminal apparatus of family member of user registered |
| ID-003 | Periodically notify until answerback is received, and increase sound and vibration used in notification with increase in elapsed time |
| ID-004 | Periodically notify until answerback is received, and shorten notification interval with increase in elapsed time |

Travel support list information (b2)

| Support ID | Company name | Address | Location | Telephone number | E-mail address | URL |
|---|---|---|---|---|---|---|
| SP-001 | ABC Taxi | RRR | SSS | TTT | UUU | VVV |
| SP-002 | LMN Designated driver service | aaa | bbb | ccc | ddd | eee |
| SP-003 | XYZ Guide | — | — | — | — | fff |

FIG. 7

First account device 17

User information c1

| User ID | Name | Address | Telephone number | E-mail address | Vehicle ID | Position | Relationship |
|---|---|---|---|---|---|---|---|
| AAA | ○○○ | △△△ | □□□ | CCCC | EEE | FFF | Contractor |
| BBB | ●●● | ▲▲▲ | ■■■ | DDDD | EEE | GGG | Family |

Vehicle information c2

| Vehicle ID | Vehicle name | Vehicle number | Parking position | IP address |
|---|---|---|---|---|
| EEE | WWW | XXXX | YYY | ZZZ |

Security apparatus information c3

| Apparatus ID | Apparatus name | IP address |
|---|---|---|
| ggg | hhh | iii |

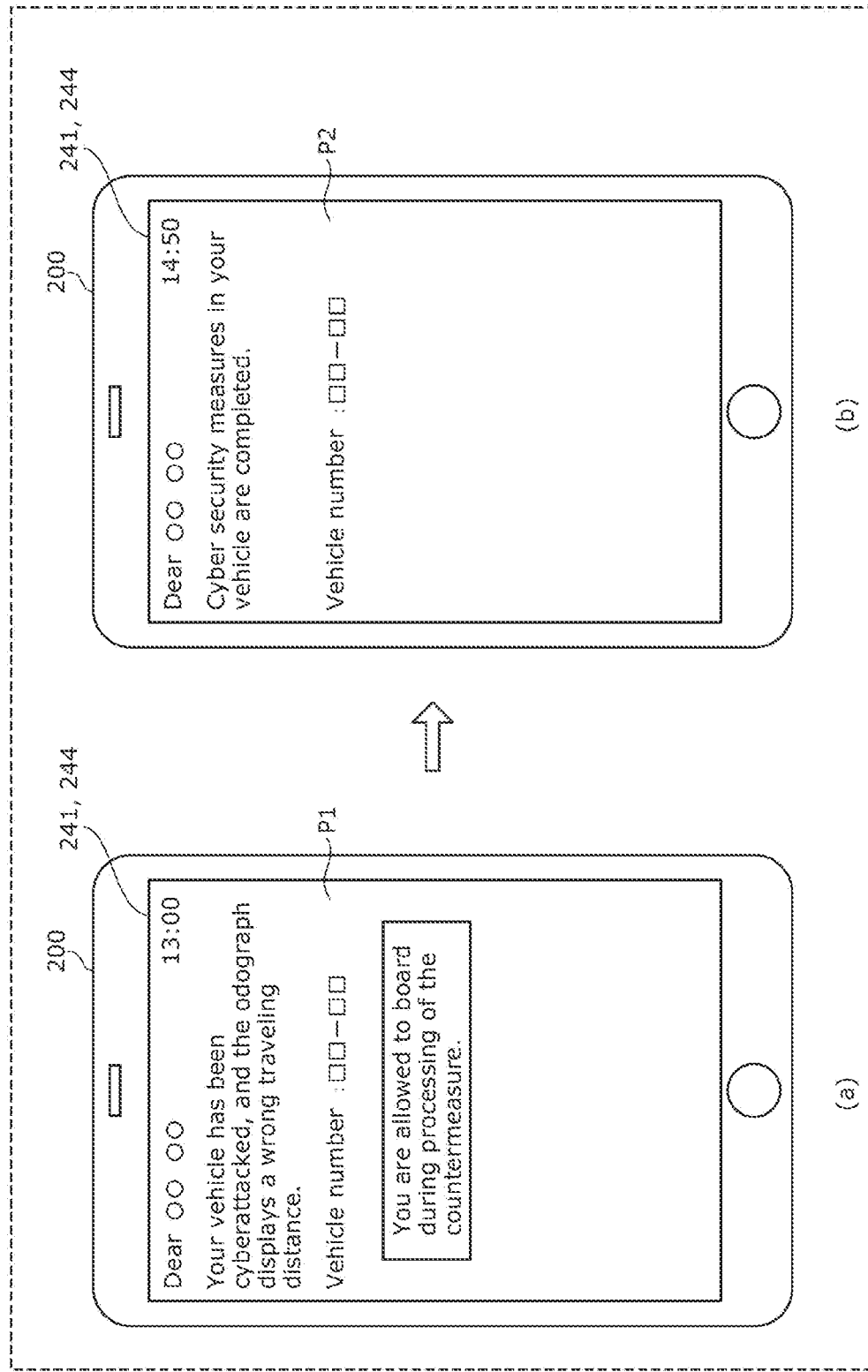

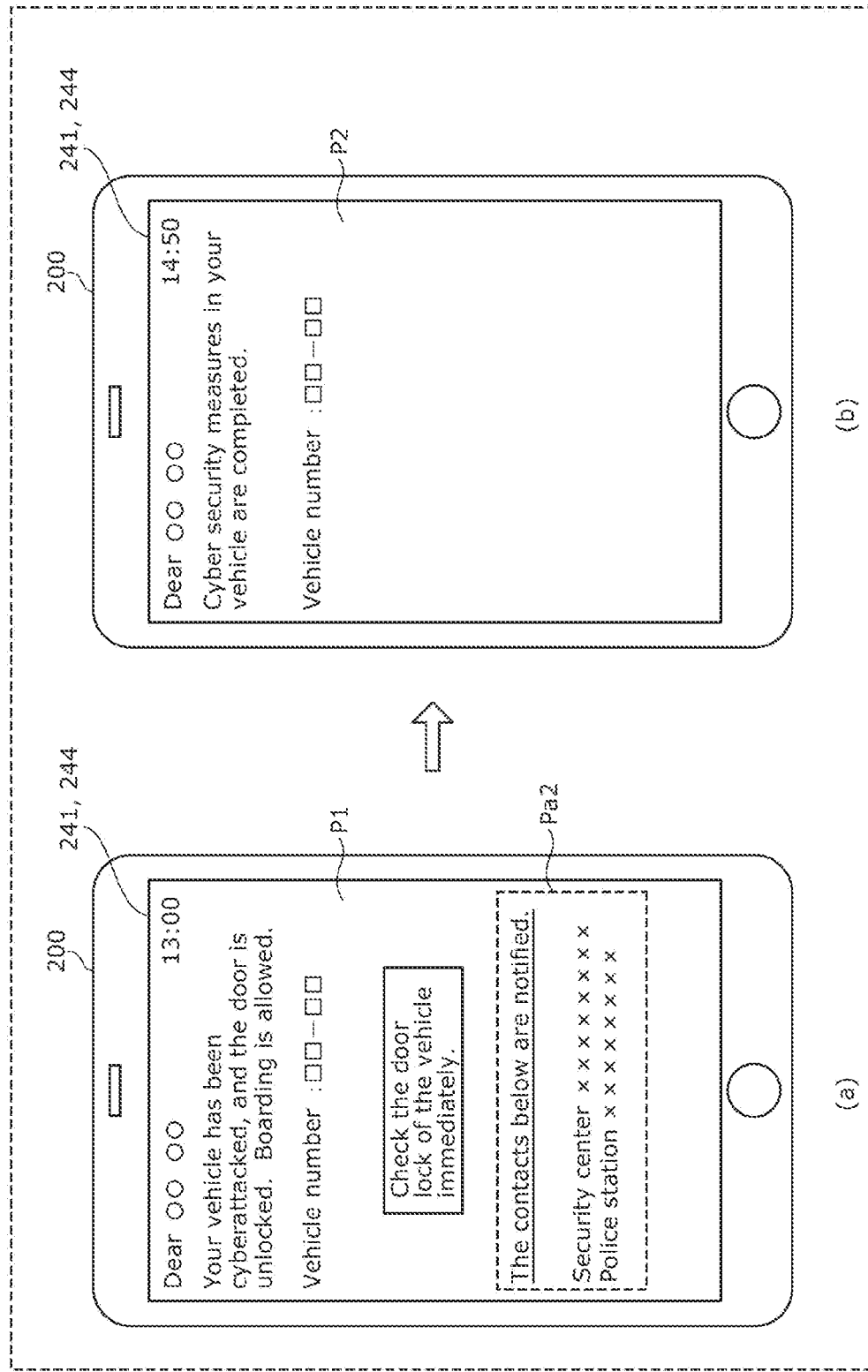

SECURITY APPARATUS, SECURITY METHOD, AND RECORDING MEDIUM

CROSS REFERENCE TO RELATED APPLICATION

The present application is based on and claims priority of Japanese Patent Application No. 2022-195467 filed on Dec. 7, 2022.

FIELD

The present disclosure relates to a security apparatus that takes a countermeasure against a cyberattack against a vehicle.

BACKGROUND

Traditionally, security apparatuses that keep safety against cyberattacks to vehicles are proposed (for example, see Patent Literature (PTL) 1, PTL 2, and PTL 3). PTL 1 discloses a cyberattack notification apparatus as the above-mentioned security apparatus. This cyberattack notification apparatus detects a cyberattack against a vehicle, and notifies an apparatus located inside or outside the vehicle of the cyberattack based on whether the driver is present inside or outside the vehicle. PTL 2 discloses a system for a vehicle as the above-mentioned security apparatus. This system for a vehicle changes a method of communicating with an outside of the vehicle, a method of protecting the vehicle against a fraudulent attack, and a method of storing logs according to the depth of the fraudulent attack against the vehicle. The security apparatus disclosed in PTL 3 detects an attack against an apparatus network, calculates the risk level of the apparatus network, and determines a countermeasure against the attack based on the risk level.

CITATION LIST

Patent Literature

PTL 1: Japanese Unexamined Patent Application Publication No. 2019-219709
PTL 2: Japanese Unexamined Patent Application Publication No. 2019-125344
PTL 3: WO 2021-019635

SUMMARY

However, the security apparatuses disclosed in PTLs 1 to 3 can be improved upon.

Thus, the present disclosure provides a security apparatus further improved.

The security apparatus according to one aspect of the present disclosure includes a boarding determiner that determines whether a user is allowed or prohibited to board a vehicle when the vehicle receives a cyberattack while the user is not on board the vehicle, and a notification processor that notifies a terminal apparatus of a result of determination by the boarding determiner, the terminal apparatus being located outside the vehicle and used by the user.

These general or specific aspects may be implemented by a system, a method, an integrated circuit, a computer program, or a recording medium such as a computer-readable CD-ROM, or may be implemented by any combination of systems, methods, integrated circuits, computer programs, and recording media. The recording medium may be a non-transitory recording medium.

The security apparatus according to the present disclosure can appropriately support a user when a cyberattack is performed on a vehicle which the user is not on board.

Further advantages and effects according to one aspect of the present disclosure will be clarified from the specification and the accompanying drawings. Such advantages and/or effects will be provided by the configurations described in several embodiments, the specification, and the accompanying drawings, but all the configurations are not always needed.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 5 is a diagram illustrating one example of pieces of information stored in a second account device of the security apparatus according to the embodiment.

FIG. 6 is a diagram illustrating one example of pieces of information stored in the database of the security apparatus according to the embodiment.

FIG. 7 is a diagram illustrating one example of pieces of information stored in a first account device of the vehicle according to the embodiment.

FIG. 16 is a diagram illustrating another example of the situation notification image and the countermeasure result image according to the embodiment.

FIG. 17 is a diagram illustrating another example of the situation notification image and the countermeasure result image according to the embodiment.

DESCRIPTION OF EMBODIMENT

Figure 1:
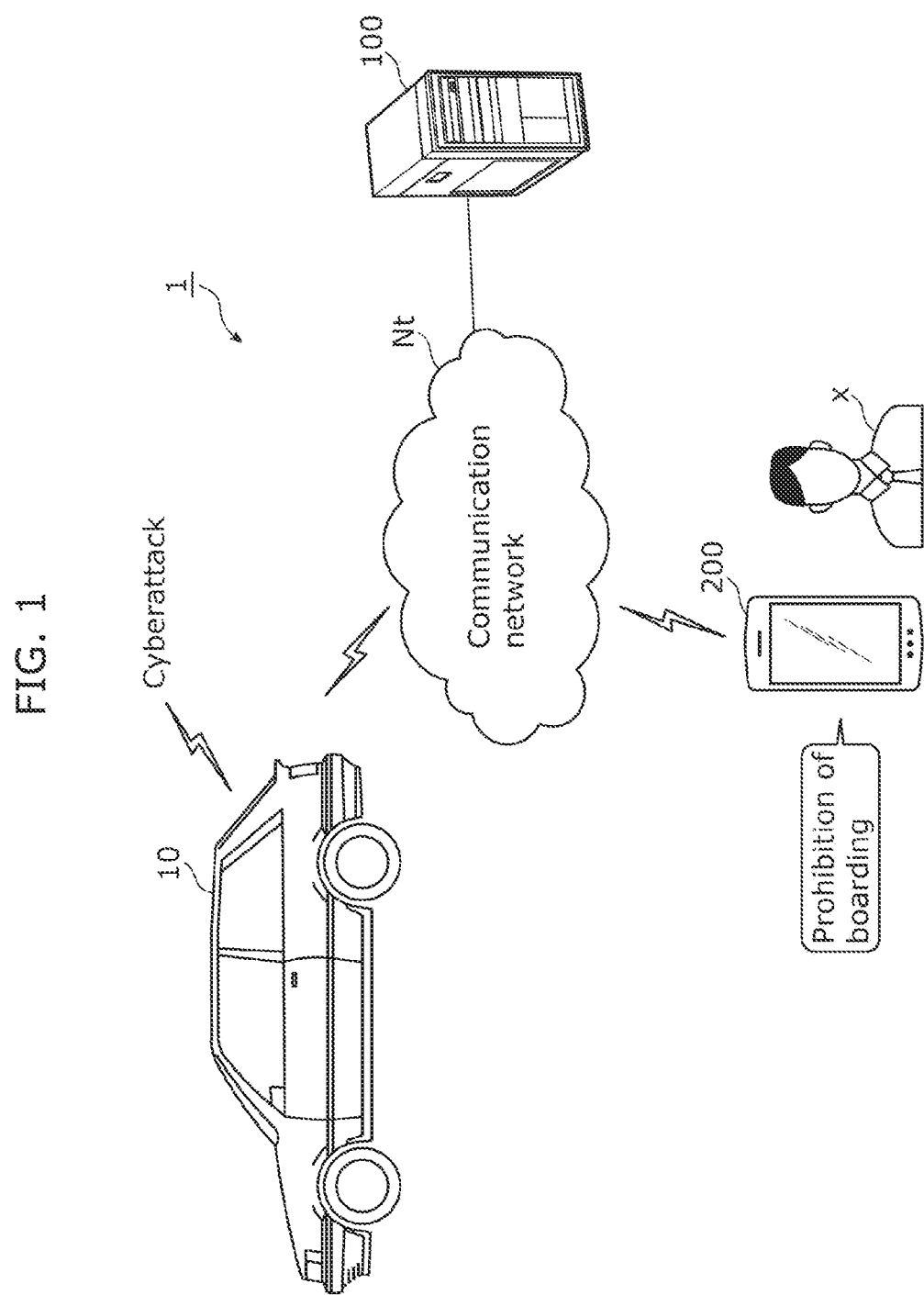
FIG. 1 is a block diagram illustrating the entire security system according to an embodiment.

The security apparatus according to a first aspect of the present disclosure includes a boarding determiner that determines whether a user is allowed or prohibited to board a vehicle when the vehicle receives a cyberattack while the user is not on board the vehicle, and a notification processor that notifies a terminal apparatus of a result of determination by the boarding determiner, the terminal apparatus being located outside the vehicle and used by the user. The terminal apparatus may be a smartphone or the like.

Thereby, when the vehicle receives a cyberattack while the user is not on board the vehicle, it is determined whether the user is allowed or prohibited to board the vehicle, and the terminal apparatus is notified of the result of determination. Thus, the user, if carrying the terminal apparatus, can easily grasp whether the user is allowed or prohibited to board the vehicle. This configuration can prevent the user from boarding the vehicle in danger which receives the cyberattack. As a result, the user can be appropriately supported. Hereinafter, "allowed to board" is also expressed as "allowance of boarding", and "prohibited to board" is also expressed as "prohibition of boarding".

In other words, the security apparatuses disclosed in PTLs 1 to 3 have a problem of insufficient support for the user when the vehicle receives a cyberattack while the user is not on board the vehicle. For example, in the cyberattack notification apparatus disclosed in PTL 1, an apparatus outside the vehicle is notified of the cyberattack. However, even when the user of the vehicle grasps the cyberattack of which the apparatus is notified, the user cannot easily determine what to do. In contrast, in the present disclosure, the user can be appropriately supported when the vehicle receives the cyberattack while the user is not on board the vehicle.

In the security apparatus according to a second aspect subordinate to the first aspect, the notification processor may notify the terminal apparatus of travel support information concerning a transportation means other than the vehicle when prohibition of boarding is determined as the result of determination.

Thereby, the terminal apparatus is notified of the travel support information, and therefore the user can easily get the information concerning the transportation means other than the vehicle from the terminal apparatus. As a result, the user can travel using the transportation means other than the vehicle without boarding the vehicle. Thus, the travel of the user can be supported.

In the security apparatus according to a third aspect subordinate to the second aspect, the notification processor may notify the terminal apparatus of the travel support information concerning the transportation means selected by an input operation to the terminal apparatus by the user among a plurality of transportation means.

Thereby, the user can select a desired transportation means by the input operation, and easily get the information concerning the transportation means. Thus, the travel of the user can be further supported.

In the security apparatus according to a fourth aspect subordinate to any one of the first to third aspects, the security apparatus may further include a countermeasure instructor that instructs the vehicle to take a countermeasure against the cyberattack which the vehicle received, when the prohibition of boarding is determined as the result of determination.

Thereby, the countermeasure against the cyberattack is instructed to the vehicle, and therefore the vehicle can take the countermeasure according to the instruction from the security apparatus even when the countermeasure cannot be taken only by the vehicle. For example, the program altered by the cyberattack can be restored by a patch provided from the security apparatus.

In the security apparatus according to a fifth aspect subordinate to the fourth aspect, in the instruction of the countermeasure against the cyberattack, the countermeasure instructor may instruct the vehicle to stop starting of the vehicle. The "stop of starting of the vehicle" means that execution of starting of the vehicle is made unable, and also refers to as prohibition of start.

Thereby, starting of the vehicle is not performed, and therefore the travel of the vehicle different from the intention of the user can be suppressed, enhancing safety.

In the security apparatus according to a sixth aspect subordinate to the fifth aspect, the countermeasure instructor may further instruct the vehicle to cancel the stop of starting of the vehicle when the countermeasure against the cyberattack is taken in the vehicle.

Thereby, the stop of starting of the vehicle is canceled after the countermeasure against the cyberattack is taken. Thus, travel of the vehicle as intended by the user can be implemented while safety is ensured.

In the security apparatus according to a seventh aspect subordinate to any one of the first to sixth aspects, when the prohibition of boarding is determined as the result of determination by the boarding determiner, the notification processor may identify a distance between the terminal apparatus and the vehicle, and change a notification mode for notification of the prohibition of boarding according to the distance. The notification in the notification mode may be an initial temporary notification when the prohibition of boarding is determined, or when the notification is continuously performed, the notification mode may change according to the distance every time when the notification is performed.

Thereby, the notification mode changes according to the distance between the terminal apparatus and the vehicle, that is, the distance between the user carrying the terminal apparatus and the vehicle. Thus, prohibition of boarding the vehicle can be more clearly conveyed to the user who is going to board the vehicle.

For example, in the security apparatus according to an eighth aspect subordinate to the seventh aspect, the notification mode is expressed by at least one of a sound output from the terminal apparatus or vibration of the terminal apparatus, and the notification processor may change the notification mode according to the distance to increase the at least one of the sound or the vibration with a decrease in the distance.

Thereby, when the user approaches the vehicle to board the vehicle, a large sound is output from the terminal apparatus carried by the user, or the terminal apparatus strongly vibrates. As a result, prohibition of boarding the vehicle can be more clearly conveyed to the user who is going to board the vehicle, and the user can be strongly warned not to board the vehicle.

In the security apparatus according to a ninth aspect subordinate to any one of the first to eighth aspects, when the prohibition of boarding is determined as the result of determination, the notification processor may identify an elapsed time from the determination of the prohibition of boarding, and change a notification mode for continuous notification of the prohibition of boarding according to the elapsed time.

Thereby, the notification mode changes according to the elapsed time. Thus, the user can be easily noticed that the user is prohibited to board the vehicle.

For example, in the security apparatus according to a tenth aspect subordinate to the ninth aspect, the notification mode is expressed by at least one of a sound output from the terminal apparatus or vibration of the terminal apparatus, and the notification processor may change the notification mode according to the elapsed time to increase the at least one of the sound or the vibration with an increase in the elapsed time.

Thereby, even when the user does not notice the prohibition of boarding by the notification with the initial sound or vibration, the sound or vibration becomes larger according to the elapsed time. As a result, the prohibition of boarding the vehicle can be more clearly conveyed to a user who is difficult to notice the notification, and the user can be strongly warned not to board the vehicle.

In the security apparatus according to an eleventh aspect subordinate to the ninth aspect, the notification mode is expressed by a cycle of at least one of a sound repeatedly output from the terminal apparatus or vibration of the terminal apparatus repeatedly occurring, and the notification processor may change the notification mode according to the elapsed time to shorten the cycle with an increase in the elapsed time.

Thereby, even when the user does not notice the prohibition of boarding by the notification at the initial cycle of the sound or vibration, the cycle of the sound or vibration is shortened according to the elapsed time. As a result, the prohibition of boarding the vehicle can be more clearly conveyed to a user who is difficult to notice the notification, and the user can be strongly warned not to board the vehicle.

In the security apparatus according to a twelfth aspect subordinate to any one of the seventh to eleventh aspects, the notification processor may stop continuously-performed notification of the prohibition of boarding in the notification mode in response to an answerback signal from the terminal apparatus.

Thereby, after the user notices the prohibition of boarding, the user can transmit the answerback signal to the terminal apparatus to stop the notification. As a result, notification of no use can be avoided, and processing loads on the security apparatus and the terminal apparatus can be reduced.

To be noted, the components such as the boarding determiner, the notification processor, and the countermeasure instructor described above or a group of components may be implemented by a circuit such as a processor and a memory connected to the circuit.

In the security apparatus according to a thirteenth aspect, when the prohibition of boarding is determined as the result of determination, the circuitry may further notify another terminal apparatus of the result of determination, the another terminal apparatus being different from the terminal apparatus. The thirteenth aspect may be subordinate to any one of the first to twelfth aspects.

Thereby, the terminal apparatus of a family member is also notified of the prohibition of boarding of the vehicle, for example. This configuration can prevent the family member from boarding the vehicle.

In the security apparatus according to a fourteenth aspect, the circuitry may continuously identify the distance between the terminal apparatus and the vehicle at a plurality of timings, and change the notification mode at each of the plurality of timings according to the distance identified at the timing. For example, when the notification is continuously performed as described above, the notification mode changes according to the distance every time when the notification is performed. The fourteenth aspect may be subordinate to the seventh aspect.

Thereby, the prohibition of boarding the vehicle can be more clearly conveyed to the user who is going to board the vehicle.

In the security apparatus according to a fifteenth aspect, as the countermeasure against the cyberattack, the circuitry may instruct the vehicle to restore a program altered by the cyberattack. The fifteenth aspect may be subordinate to any one of the fourth to sixth aspects.

Thereby, the countermeasure against the cyberattack can be appropriately taken.

In the security apparatus according to a sixteenth aspect, when the circuitry instructs the vehicle to restore the program altered, the circuitry may transmit a modification program for restoring the program altered, to the vehicle. The sixteenth aspect may be subordinate to the fifteenth aspect.

Thereby, the program can be effectively restored.

In the security apparatus according to a seventeenth aspect, when the circuitry receives a notification of a result of the countermeasure against the cyberattack from the vehicle, the circuitry may further cause the terminal apparatus to display the result of the countermeasure by notifying the terminal apparatus of the result of the countermeasure. The seventeenth aspect may be subordinate to any one of the fourth to sixth aspects.

Thereby, the user, who sees the result of processing, can feel safe to board the vehicle.

In the security apparatus according to an eighteenth aspect, the circuitry may further calculate a time when the countermeasure against the cyberattack will be completed as a vehicle restoration time scheduled, and notify the terminal apparatus of the vehicle restoration time scheduled. The eighteenth aspect may be subordinate to any one of the fourth to sixth aspects.

Thereby, the user can know the vehicle restoration time scheduled, leading to an improvement in convenience.

Embodiment

FIG. 1 is a block diagram of the entire security system according to the present embodiment.

Security system 1 according to the present embodiment includes vehicle 10, security apparatus 100, and terminal apparatus 200. Vehicle 10, security apparatus 100, and terminal apparatus 200 are communicably connected to each other via communication network Nt such as the Internet.

Vehicle 10 is a vehicle used by user x, and includes an electronic control system. The electronic control system has functions such as a drive control function, an autonomous driving function, and telematics. For this reason, the electronic control system of vehicle 10 may receive a cyberattack.

Terminal apparatus 200 is a communication terminal used by user x, and is configured as a smartphone, a tablet terminal, or a personal computer, for example. Such terminal apparatus 200 is carried by user x, and is located outside vehicle 10 when user x is not on board vehicle 10.

When vehicle 10 receives a cyberattack, security apparatus 100 instructs a countermeasure against the cyberattack against vehicle 10. When user x is not on board vehicle 10 and vehicle 10 receives a cyberattack, security apparatus 100 according to the present embodiment notifies terminal apparatus 200 of the situation of vehicle 10, i.e., information concerning the cyberattack via communication network Nt. The situation of vehicle 10 includes whether user x is allowed to board vehicle 10. When terminal apparatus 200 is carried by user x, it can also be said that the notification of terminal apparatus 200 is the notification of user x.

Figure 2:
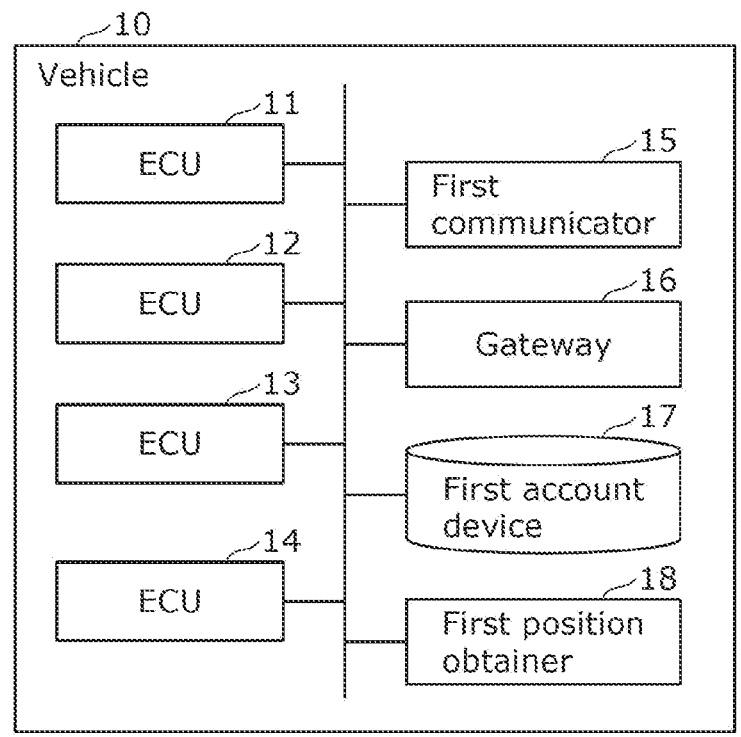
FIG. 2 is a block diagram illustrating one example of the functional configuration of a vehicle according to the embodiment.

FIG. 2 is a block diagram illustrating one example of the functional configuration of vehicle 10.

Vehicle 10 includes electronic control units (ECUs) 11 to 14, first communicator 15, gateway 16, first account device 17, and first position obtainer 18. These components constitute a network such as a controller area network (CAN). It can also be said that these components constitute the above-mentioned electronic control system.

ECUs 11 to 14 control steering, vehicle speed, braking, and the like of vehicle 10. ECUs 11 to 14 may control a car audio system, a car navigation apparatus, and an odograph. The functions related to the drive control function, the autonomous driving function, and telematics are implemented by these ECUs 11 to 14. At least one of ECU 11, 12, 13, or 14 may determine, based on the result of sensing by a sensor attached to vehicle 10, whether user x is on board vehicle 10. The sensor may be a camera, or may be a weight sensor.

First communicator 15 communicates with security apparatus 100 and terminal apparatus 200 via communication network Nt.

When first communicator 15 receives a signal from security apparatus 100 and terminal apparatus 200 via communication network Nt, gateway 16 outputs the signal to at least one of ECU 11, 12, 13, or 14. On the other hand, when at least one of ECU 11, 12, 13, or 14 outputs the signal, gateway 16 causes first communicator 15 to transmit the signal to at least one of security apparatus 100 or terminal apparatus 200 via communication network Nt. Gateway 16 monitors signals transmitted to and received from ECUs 11 to 14 and first communicator 15 to detect a cyberattack. Gateway 16 notifies security apparatus 100 of a request for a countermeasure against the cyberattack via first communicator 15 according to the content of the cyberattack. By this notification of a request for a countermeasure, the content of the cyberattack and the boarding situation of vehicle 10 are transmitted to security apparatus 100. The boarding situation indicates whether user x is on board vehicle 10, and is identified based on the determination by at least one of ECU 11, 12, 13, or 14. Furthermore, gateway 16 takes a countermeasure against the cyberattack detected.

First account device 17 is a recording medium that holds information concerning user x, vehicle 10, and security apparatus 100. For example, first account device 17 is a hard disk drive, a random access memory (RAM), a read only memory (ROM), or a semiconductor memory. To be noted, such first account device 17 may be volatile, or may be non-volatile.

First position obtainer 18 obtains vehicle position information indicating the position of vehicle 10 using a global navigation satellite system (GNSS) such as a global positioning system (GPS). Such vehicle position information is transmitted from first position obtainer 18 through gateway 16 and first communicator 15 to security apparatus 100 as needed.

Figure 3:
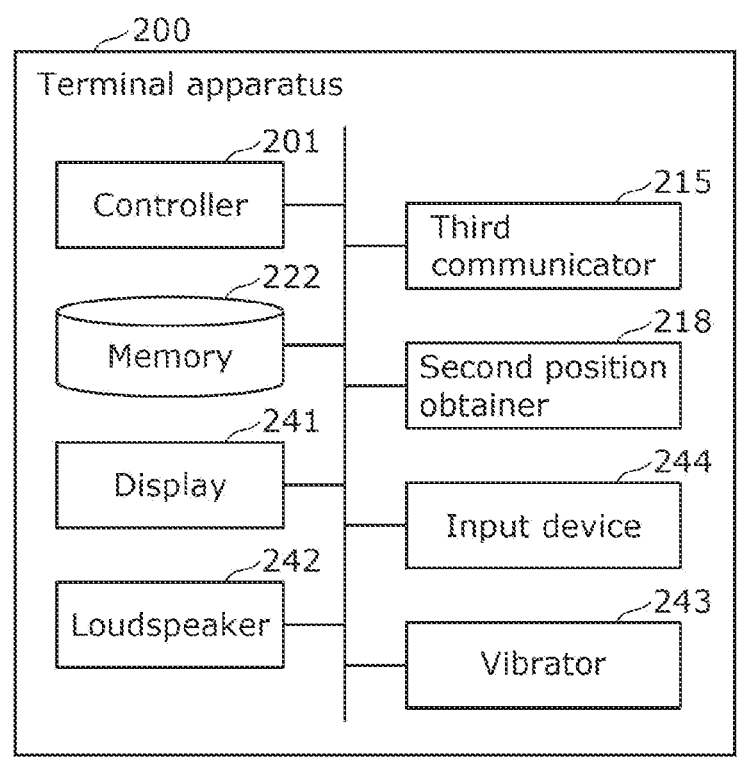
FIG. 3 is a block diagram illustrating one example of the functional configuration of a terminal apparatus according to the embodiment.

FIG. 3 is a block diagram illustrating one example of the functional configuration of terminal apparatus 200.

Terminal apparatus 200 includes controller 201, third communicator 215, memory 222, second position obtainer 218, display 241, loudspeaker 242, vibrator 243, and input device 244.

Controller 201 is configured of a central processing unit (CPU) and a processor, for example, and controls the components included in terminal apparatus 200 by executing programs stored in memory 222.

Third communicator 215 communicates with vehicle 10 and security apparatus 100 via communication network Nt in response to the control by controller 201.

Memory 222 is a recording medium that stores the above-mentioned programs, information, and data. For example, memory 222 is a RAM, a ROM, or a semiconductor memory. Such memory 222 may be volatile, or may be non-volatile.

Second position obtainer 218 obtains terminal position information indicating the position of terminal apparatus 200 using a GNSS such as a GPS. Such terminal position information is transmitted from second position obtainer 218 through third communicator 215 to security apparatus 100 as needed.

Display 241 is a display that displays an image or letters in response to the control by controller 201. Specifically, display 241 is a liquid crystal display or an organic electroluminescence (EL) display, but not limited thereto.

Loudspeaker 242 outputs a sound or a voice in response to the control by controller 201.

Vibrator 243 vibrates in response to the control by controller 201. This vibration conducts across terminal apparatus 200. Therefore, vibrator 243 vibrates terminal apparatus 200.

Input device 244 accepts the input operation by user x, and outputs a signal in response to the input operation to controller 201. Such input device 244 may be integrally formed with display 241. In this case, input device 244 and display 241 are configured as a touch panel. Specifically, input device 244 is disposed in display 241, which is configured as a touch sensor that accepts operations corresponding to images displayed on display 241, such as icons, by touching the images by user x. Input device 244 may be provided with a physical button, and an input operation corresponding to the button may be accepted by pressing the button by user x.

Figure 4:
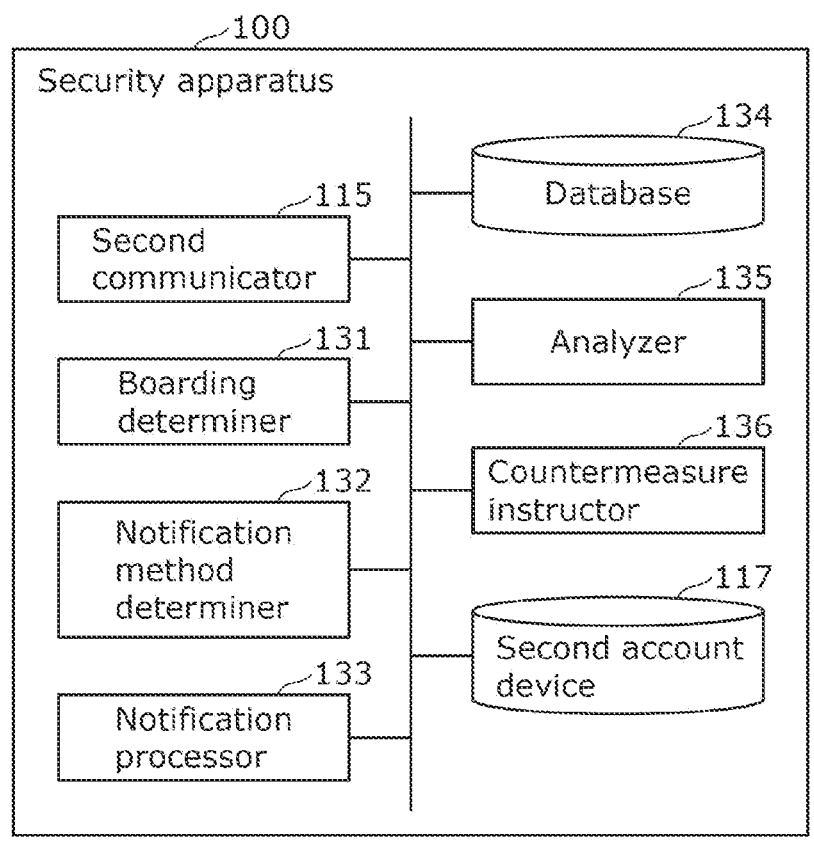
FIG. 4 is a block diagram illustrating one example of the functional configuration of a security apparatus according to the embodiment.

FIG. 4 is a block diagram illustrating one example of the functional configuration of security apparatus 100.

Security apparatus 100 includes second communicator 115, boarding determiner 131, notification method determiner 132, notification processor 133, database 134, analyzer 135, countermeasure instructor 136, and second account device 117.

Second communicator 115 communicates with vehicle 10 and terminal apparatus 200 via communication network Nt. For example, second communicator 115 accepts a request for a countermeasure against a cyberattack, the request being sent from vehicle 10.

When vehicle 10 receives a cyberattack while user x is not on board, boarding determiner 131 determines whether user x is allowed to board vehicle 10. Specifically, when second communicator 115 receives a notification of the request for a countermeasure, boarding determiner 131 determines, in response to the notification of the request for a countermeasure, whether user x is allowed to board. The request for a countermeasure includes the content of the cyberattack and the boarding situation of vehicle 10.

When boarding determiner 131 determines prohibition of boarding (namely, boarding prohibited), notification method determiner 132 determines a notification method for notifying user x of this prohibition of boarding.

Notification processor 133 notifies terminal apparatus 200 of the result of determination by boarding determiner 131 via second communicator 115, terminal apparatus 200 being located outside vehicle 10 and used by user x.

In response to the request for a countermeasure from vehicle 10, analyzer 135 analyzes the cyberattack against vehicle 10, and notifies countermeasure instructor 136 of the result of analysis.

After receiving the notification of the result of analysis from analyzer 135, countermeasure instructor 136 instructs vehicle 10 through second communicator 115 about a countermeasure against the cyberattack according to the result of analysis. For example, when prohibition of boarding is determined as the result of determination by boarding determiner 131, countermeasure instructor 136 according to the present embodiment instructs vehicle 10 about a countermeasure against the cyberattack given to vehicle 10. Even when allowance of boarding is determined as the result of determination, countermeasure instructor 136 may instruct vehicle 10 about a countermeasure against the cyberattack given to vehicle 10.

Second account device 117 is a recording medium that stores information concerning user x, vehicle 10, and security-related organizations.

Database 134 is a recording medium that stores data used in determination by notification method determiner 132 and data used in processing by notification processor 133. Second account device 117 and database 134 are hard disk drives, RAMS, ROMS, or semiconductor memories. Such second account device 117 and database 134 may be volatile, or may be non-volatile.

FIG. 5 is a diagram illustrating one example of pieces of information stored in second account device 117 of security apparatus 100.

Second account device 117 stores user information a1, vehicle information a2, and contact information a3.

For each user, the user ID (identification), the name, the address, the telephone number, the e-mail address, the vehicle ID, the position, and the relationship with the user are shown in user information a1. The user ID is information for identifying the user. The e-mail address is an e-mail address that can be used in the terminal apparatus of the user. The vehicle ID is information for identifying the vehicle used by the user. The position is a position at which the terminal apparatus of the user is located, and is positional coordinates of the terminal apparatus obtained by the GNSS. When the terminal apparatus is carried by the user, it can also be said that the position is the position of the user. The relationship indicates that the user is a contractor of the security service by security system 1 or a family member of the contractor. In user information a1, the user ID, the name, and the address of user x are also shown. For example, the user ID of user x is "AAA", and is associated with the relationship "Contractor". The position of user x shown in user information a1 is the position shown in the terminal position information obtained by second position obtainer 218 of terminal apparatus 200.

For example, such user information a1 is generated by vehicle 10, and is transmitted to security apparatus 100. The positions of users shown in user information a1 are updated as needed by the terminal position information transmitted from the terminal apparatus of the user.

Although the e-mail addresses of users are shown in user information a1, instead of or in addition of the e-mail addresses, other addresses may be shown. Examples of the other addresses include internet protocol (IP) address and a media access control (MAC) address of the terminal apparatus used by the user.

The vehicle ID, the vehicle name, the vehicle number, the parking position, and the IP address of vehicle 10 are shown in vehicle information a2. The vehicle ID is information for identifying vehicle 10. The parking position is the position shown in the vehicle position information obtained by first position obtainer 18 of vehicle 10.

As in the case of user information a1, for example, such vehicle information a2 is also generated by vehicle 10, and is transmitted to security apparatus 100. The parking position shown in vehicle information a2 is updated as needed by the vehicle position information transmitted from vehicle 10.

For each security-related organization, the ID, the company name, the address, the location, the telephone number, the e-mail address, and the uniform resource locator (URL) of the organization are shown in contact information a3. These organizations may include police stations. The location of the organization is configured of the latitude and longitude of the position corresponding to the address of the organization.

FIG. 6 is a diagram illustrating one example of pieces of information stored in database 134 of security apparatus 100.

Database 134 stores notification method information b1 and travel support list information b2.

Notification method information b1 shows a plurality of cyberattack notification methods. Notification method determiner 132 selects at least one notification method from the plurality of notification methods. The at least one notification method selected is used in notification of terminal apparatus 200 by notification processor 133. Specifically, these notification methods are methods for notification of the situation of vehicle 10 including the result of determination by boarding determiner 131. The result of determination is the result of determination whether user x is allowed to board vehicle 10. For each notification method, such notification method information b1 shows the notification ID of the notification method and the content of the notification method.

The content of the notification method associated with notification ID "ID-000" is normal notification. In the normal notification, when vehicle 10 receives a cyberattack, a situation notification image indicating the situation of vehicle 10 is displayed on display 241 of terminal apparatus 200. Furthermore, a warning sound is output from the loudspeaker of terminal apparatus 200, and terminal apparatus 200 is vibrated by vibrator 243 of terminal apparatus 200.

Specifically, when second communicator 115 receives a notification of the request for a countermeasure from vehicle 10, notification method determiner 132 of security apparatus 100 first selects the notification method with notification ID "ID-000" irrespective of the result of determination by boarding determiner 131. Notification processor 133 then performs the normal notification. In other words, notification processor 133 identifies the e-mail address of user x associated with the relationship "Contractor" from user information a1 in second account device 117. The notification of the request for a countermeasure is a notification requesting a countermeasure against the cyberattack. Notification processor 133 transmits an e-mail including the above-mentioned situation notification image to the e-mail address through second communicator 115. At this time, notification processor 133 further transmits a notification signal to terminal apparatus 200 through second communicator 115. The notification signal indicates the sound volume and the vibration parameter (such as the number of vibrations or the amplitude), for example. When third communicator 215 receives the notification signal, controller 201 of terminal apparatus 200 causes the warning sound having a sound volume indicated by the notification signal to be output from loudspeaker 242, and further causes vibrator 243 to vibrate according to the vibration parameter indicated by the notification signal.

The contents of the notification methods associated with notification IDs "ID-001" to "ID-004" are notifications performed in addition to the normal notification (namely, additional notifications). The additional notifications are continuously performed until user x checks the notification of the situation of vehicle 10.

Notification processor 133 of security apparatus 100 grasps from the answerback by user x that user x checks the notification of the situation of vehicle 10. Specifically, after the answerback by user x is received as an input operation, input device 244 of terminal apparatus 200 outputs a signal indicating the answerback (hereinafter, also referred to as answerback signal) to controller 201. Controller 201 transmits the answerback signal from third communicator 215 to security apparatus 100 via communication network Nt. After the answerback signal is received, second communicator 115 of security apparatus 100 outputs the answerback signal to notification processor 133. Thereby, by obtaining the answerback signal, notification processor 133 grasps that there is an answerback, namely, user x checks the notification of the situation of vehicle 10.

In the notification method with notification ID "ID-001", when user x approaches vehicle 10 within a predetermined distance, the situation of vehicle 10 is notified with a sound volume and vibration larger than those in the normal notification. The predetermined distance may be 10 m or may be 50 m, and is not limited to these distances. When user x approaches vehicle 10 within a predetermined distance and further approaches vehicle 10 within a predetermined distance or closer, the situation of vehicle 10 is notified with a sound volume and vibration larger than those of the previous notification.

Specifically, when prohibition of boarding is determined as the result of determination by boarding determiner 131, notification method determiner 132 of security apparatus 100 selects not only the notification method with notification ID "ID-000" but also the notification method with notification ID "ID-001". Notification processor 133, after performing the normal notification, further performs an additional notification by the notification method selected. In the additional notification, notification processor 133 first identifies the distance between the position of terminal apparatus 200 shown in user information a1 (namely, the position of user x) and the parking position shown in vehicle information a2 as a user-vehicle distance. Notification processor 133 then transmits the above-mentioned notification signal to terminal apparatus 200 through second communicator 115 every time when the user-vehicle distance decreases by the above-mentioned predetermined distance. Notification processor 133 increases the sound volume and the vibration parameter indicated by the notification signal every time when the notification signal is transmitted. When third communicator 215 receives the notification signal, controller 201 of terminal apparatus 200 causes a warning sound with a sound volume indicated by the notification signal to be output from loudspeaker 242, and further causes vibrator 243 to vibrate according to the vibration parameter indicated by the notification signal.

Thus, when prohibition of boarding is determined as the result of determination by boarding determiner 131, notification processor 133 according to the present embodiment identifies the distance between terminal apparatus 200 and vehicle 10, and changes the notification mode for notifying prohibition of boarding according to the distance. The distance is the above-mentioned user-vehicle distance. Specifically, the notification mode is represented by at least one of the sound output from terminal apparatus 200 or the vibration of terminal apparatus 200. Notification processor 133 then changes the notification mode according to the distance to increase at least one of the sound or the vibration as the distance decreases.

Thereby, the notification mode changes according to the distance between terminal apparatus 200 and vehicle 10, that is, the distance between user x carrying terminal apparatus 200 and vehicle 10, and therefore it can be more clearly conveyed to user x who is going to board vehicle 10 that user x is prohibited to board vehicle 10. Specifically, when user x approaches vehicle 10 to board vehicle 10, a large sound is output from terminal apparatus 200 carried by user x or terminal apparatus 200 strongly vibrates. As a result, it can be more clearly conveyed to user x who is going to board vehicle 10 that user x is prohibited to board vehicle 10, and user x can be strongly warned not to board vehicle 10.

Although the notification methods with notification ID "ID-000" and notification ID "ID-001" are selected and the notification is continuously performed in the above-mentioned example, only the notification method with notification ID "ID-000" may be selected and the notification may be temporarily performed. Even in this case, notification processor 133 may change the notification mode according to the user-vehicle distance to increase at least one of the warning sound or the vibration with a decrease in the user-vehicle distance when the request for a countermeasure is notified. In other words, the notification in the notification mode according to the user-vehicle distance may be an initial and temporal notification when the request for a countermeasure is notified and prohibition of boarding is determined. For example, when the user-vehicle distance is 1 km and vehicle 10 receives a cyberattack and a request for a countermeasure is notified, terminal apparatus 200 and user x are notified about the situation of vehicle 10 with a small warning sound and weak vibration. In contrast, when the user-vehicle distance is 10 m and vehicle 10 receives a cyberattack other than the above cyberattack and a request for a countermeasure is notified, terminal apparatus 200 and user x are notified about the situation of vehicle 10 with a large warning sound and strong vibration.

In the additional notification with notification ID "ID-002", another user who is a family member of user x is also notified about the situation of vehicle 10. The another user is a user having a relationship "Family" indicated in user information a1.

Specifically, when the prohibition of boarding is determined as the result of determination by boarding determiner 131, notification method determiner 132 of security apparatus 100 selects not only the notification method with notification ID "ID-000" but also the notification method with notification ID "ID-002". After notification processor 133 performs the normal notification, notification processor 133 further performs the additional notification of the selected notification method. In the additional notification, notification processor 133 first identifies the e-mail address associated with the relationship "Family" in user information a1. Notification processor 133 then transmits an e-mail including the above-mentioned situation notification image to the e-mail address through second communicator 115.

Thereby, the terminal apparatus of the family member is also notified about prohibition of boarding on vehicle 10, and therefore the boarding of the family member on vehicle 10 can be suppressed.

In the additional notification with notification ID "ID-003", notification of the situation of vehicle 10 is periodically repeated. As the elapsed time from the determination of prohibition of boarding increases, the notification is performed with a larger warning sound and stronger vibration.

Specifically, when the prohibition of boarding is determined as the result of determination by boarding determiner 131, notification method determiner 132 of security apparatus 100 selects not only the notification method with notification ID "ID-000" but also the notification method with notification ID "ID-003". After notification processor 133 performs the normal notification, notification processor 133 further performs the additional notification by the selected notification method. In the additional notification, notification processor 133 first transmits the above-mentioned notification signal to terminal apparatus 200 through second communicator 115 in a predetermined cycle. For each notification signal to be transmitted, notification processor 133 then increases the sound volume and the vibration parameter indicated by the notification signal. When third communicator 215 receives the notification signal, controller 201 of terminal apparatus 200 causes the warning sound having a sound volume indicated by the notification signal to be output from loudspeaker 242, and further causes vibrator 243 to vibrate according to the vibration parameter indicated by the notification signal.

Thus, when the prohibition of boarding is determined as the result of determination by boarding determiner 131, notification processor 133 according to the present embodiment identifies the elapsed time from the determination of the prohibition of boarding, and changes the notification mode for continuously notifying about the prohibition of boarding. When the notification signal is transmitted in a predetermined cycle as described above, the elapsed time is identified and the notification is continuously performed by notification processor 133. Specifically, the notification mode is represented by at least one of the sound output from terminal apparatus 200 or vibration of terminal apparatus 200. Notification processor 133 changes the notification mode according to the elapsed time to increase at least one of the sound or the vibration with an increase in the elapsed time.

Thereby, the notification mode changes according to the elapsed time, and therefore, user x can easily notice that user x is prohibited to board vehicle 10. In other words, even when user x does not notice the prohibition of boarding by the first notification using the sound or vibration, the sound or vibration is increased according to the elapsed time. As a result, it can be more clearly conveyed to user x having difficulties in noticing the notification that user x is prohibited to board vehicle 10, and user x can be strongly warned not to board vehicle 10.

In the additional notification with notification ID "ID-004", notification of the situation of vehicle 10 is periodically repeated. As the elapsed time from the determination of prohibition of boarding increases, the cycle of repetition of the notification is shortened.

Specifically, when the prohibition of boarding is determined as the result of determination by boarding determiner 131, notification method determiner 132 of security apparatus 100 selects not only the notification method with notification ID "ID-000" but also the notification method with notification ID "ID-004". After notification processor 133 performs the normal notification, notification processor 133 further performs the additional notification by the selected notification method. In the additional notification, notification processor 133 first transmits the above-mentioned notification signal to terminal apparatus 200 through second communicator 115 in a predetermined cycle. Notification processor 133 shortens the cycle as the elapsed time increases.

Thus, in the present embodiment, the notification mode is represented by the cycle of at least one of the sound repeatedly output from terminal apparatus 200 or the vibration of terminal apparatus 200 repeatedly occurring. Notification processor 133 changes the notification mode according to the elapsed time to shorten the cycle with an increase in the elapsed time.

Thereby, even when user x does not notice the notification of prohibition of boarding transmitted in the initial cycle of the sound or vibration, the cycle of the sound or vibration is shortened according to the elapsed time. As a result, it can be more clearly conveyed to user x having difficulties in noticing the notification that user x is prohibited to board vehicle 10, and user x can be strongly warned not to board vehicle 10.

Notification method determiner 132 according to the present embodiment may select one notification method from a plurality of notification methods for additional notifications indicated by notification method information b1, for example, according to the types of cyberattack, the level of danger, the degree of damage, or the portion attacked. Alternatively, notification method determiner 132 may select a notification method set by user x.

In response to an answerback signal from terminal apparatus 200, notification processor 133 according to the present embodiment stops the above-mentioned notification of the prohibition of boarding, the notification being continuously performed in the notification mode. The notification of the prohibition of boarding is a notification of the situation of vehicle 10 described above.

Thereby, after user x notices the prohibition of boarding, user x can transmit an answerback signal to terminal apparatus 200 to stop the notification. As a result, notification of no use can be avoided, and processing loads on security apparatus 100 and terminal apparatus 200 can be reduced.

Travel support list information b2 is information for presenting transportation means other than vehicle 10 to user x when the prohibition of boarding is determined by boarding determiner 131 of security apparatus 100. The transportation means refers to a taxi, a loaner car, or public transportation.

For example, for each of the transportation means, the support ID of the transportation means and the company name, the address, the location, the telephone number, the e-mail address, and the URL concerning the transportation means are indicated in travel support list information b2. For example, information associated with support ID "SP-001" is information concerning a taxi company. Information associated with support ID "SP-002" is information concerning a company which arranges a loaner car. Information associated with support ID "SP-003" is information concerning public transportation.

In response to the input operation to input device 244 of terminal apparatus 200 by user x, notification processor 133 of security apparatus 100 transmits the information of the transportation means indicated in travel support list information b2 as travel support information to terminal apparatus 200 through second communicator 115.

Thus, when the prohibition of boarding is determined as the result of determination by boarding determiner 131, notification processor 133 according to the present embodiment notifies terminal apparatus 200 of the travel support information concerning a transportation means other than vehicle 10. Specifically, notification processor 133 notifies terminal apparatus 200 of the travel support information concerning the transportation means selected from a plurality of transportation means in response to the input operation to terminal apparatus 200 by user x.

Thereby, terminal apparatus 200 is notified of the travel support information, and therefore, user x can easily get the information concerning the transportation means other than vehicle 10 from terminal apparatus 200. As a result, user x can travel using the transportation means other than vehicle 10 without boarding vehicle 10. Accordingly, travel of user x can be supported. User x also can select a desired transportation means by an input operation to easily get the information concerning the transportation means. Accordingly, travel of user x can be further supported.

FIG. 7 is a diagram illustrating one example of pieces of information stored in first account device 17 of vehicle 10.

First account device 17 stores user information c1, vehicle information c2, and security apparatus information c3.

For example, user information c1 and vehicle information c2 are the same as user information a1 and vehicle information a2 stored in second account device 117 of security apparatus 100. Such user information c1 and vehicle information c2 are transmitted from vehicle 10 to security apparatus 100, and are stored in second account device 117 of security apparatus 100.

Security apparatus information c3 is information concerning security apparatus 100. Specifically, security apparatus information c3 indicates the apparatus ID, the name of the apparatus, and the IP address of security apparatus 100. Such security apparatus information c3 is used when first communicator 15 of vehicle 10 transmits information, data, or a signal to security apparatus 100.

Figure 8:
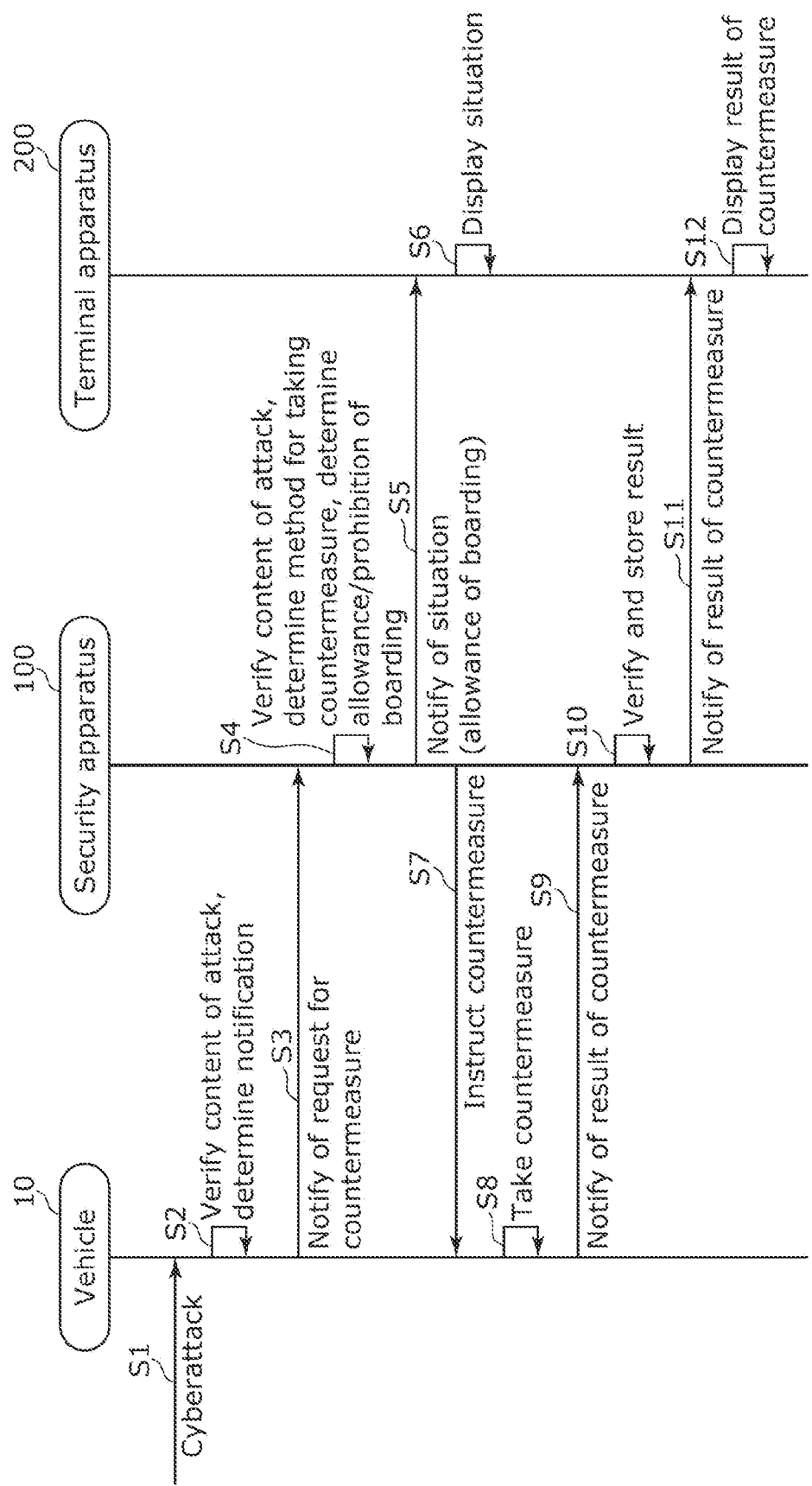
FIG. 8 is a sequence diagram illustrating one example of a processing operation of the security system according to the embodiment.

FIG. 8 is a sequence diagram illustrating one example of the processing operation of security system 1. The processing operation illustrated in FIG. 8 is an operation when vehicle 10 receives a cyberattack while user x is not on board vehicle 10. In this processing operation, vehicle 10 takes a countermeasure against the cyberattack based on the instruction by security apparatus 100, and terminal apparatus 200 is notified of allowance of boarding.

Specifically, first, vehicle 10 receives a cyberattack (step S1). Gateway 16 of vehicle 10 detects the cyberattack, and verifies the content of the cyberattack. When gateway 16 determines, based on the content of the cyberattack, that the countermeasure against the cyberattack cannot be taken only by vehicle 10, it is determined that notification of a request for a countermeasure is transmitted to security apparatus 100 (step S2). Gateway 16 then notifies security apparatus 100 of a request for a countermeasure through first communicator 15 (step S3).

When second communicator 115 receives the notification of the request for a countermeasure in step S3, analyzer 135 of security apparatus 100 verifies and analyzes the content of the cyberattack indicated by the request for a countermeasure. Based on the result of analysis of the content of the cyberattack by analyzer 135, countermeasure instructor 136 determines a method for taking the countermeasure against the cyberattack. Based on the result of analysis by analyzer 135 and the method for taking the countermeasure determined by countermeasure instructor 136, boarding determiner 131 determines that user x is allowed to board vehicle 10 (step S4). Namely, boarding determiner 131 determines allowance of boarding or prohibition of boarding (in other words, whether user x is allowed or prohibited to board). Here, boarding determiner 131 determines allowance of boarding.

Notification processor 133 of security apparatus 100 notifies terminal apparatus 200 of the situation of vehicle 10 through second communicator 115 (step S5). The notification of the situation of vehicle 10 may be performed only by the above-mentioned normal notification, or may be performed by the normal notification and additional notification. The situation of vehicle 10 includes the cyberattack performed on vehicle 10 and allowance of boarding of vehicle 10, that is, allowance of boarding. When third communicator 215 receives the notification in step S5, controller 201 of terminal apparatus 200 displays a situation notification image on display 241, the situation notification image indicating the situation of vehicle 10 notified (step S6). At this time, controller 201 further causes output of the warning sound and vibration of terminal apparatus 200 to be executed by controlling loudspeaker 242 and vibrator 243.

Countermeasure instructor 136 of security apparatus 100 instructs vehicle 10 to take the countermeasure by the determined method for taking the countermeasure (step S7). The method for taking the countermeasure is, for example, restoration of the program used in one of ECUs 11 to 14, and is specifically application of a patch to the program as one example. The patch is also called a modification program or an update program. Specifically, countermeasure instructor 136 transmits a patch and a command signal of restoring the program based on the patch to vehicle 10 through second communicator 115. When first communicator 15 receives the patch and the command signal, gateway 16 of vehicle 10 restores the program using the patch. In other words, vehicle 10 takes the countermeasure by the method for taking the countermeasure determined by countermeasure instructor 136 (step S8). When the countermeasure is completed, gateway 16 notifies security apparatus 100 of the result of the countermeasure through first communicator 15 (step S9).

When second communicator 115 receives the notification in step S9, notification processor 133 of security apparatus 100 verifies the result of the countermeasure, and stores information indicating the result of the countermeasure, for example, in database 134 (step S10). Furthermore, notification processor 133 notifies terminal apparatus 200 of the result of the countermeasure through second communicator 115 (step S11). Specifically, notification processor 133 transmits an e-mail indicating the result of the countermeasure to the e-mail address of user x. When third communicator 215 receives the notification in step S11, controller 201 of terminal apparatus 200 displays an image indicating the result of the countermeasure on display 241 as a countermeasure result image (step S12).

Figure 9:
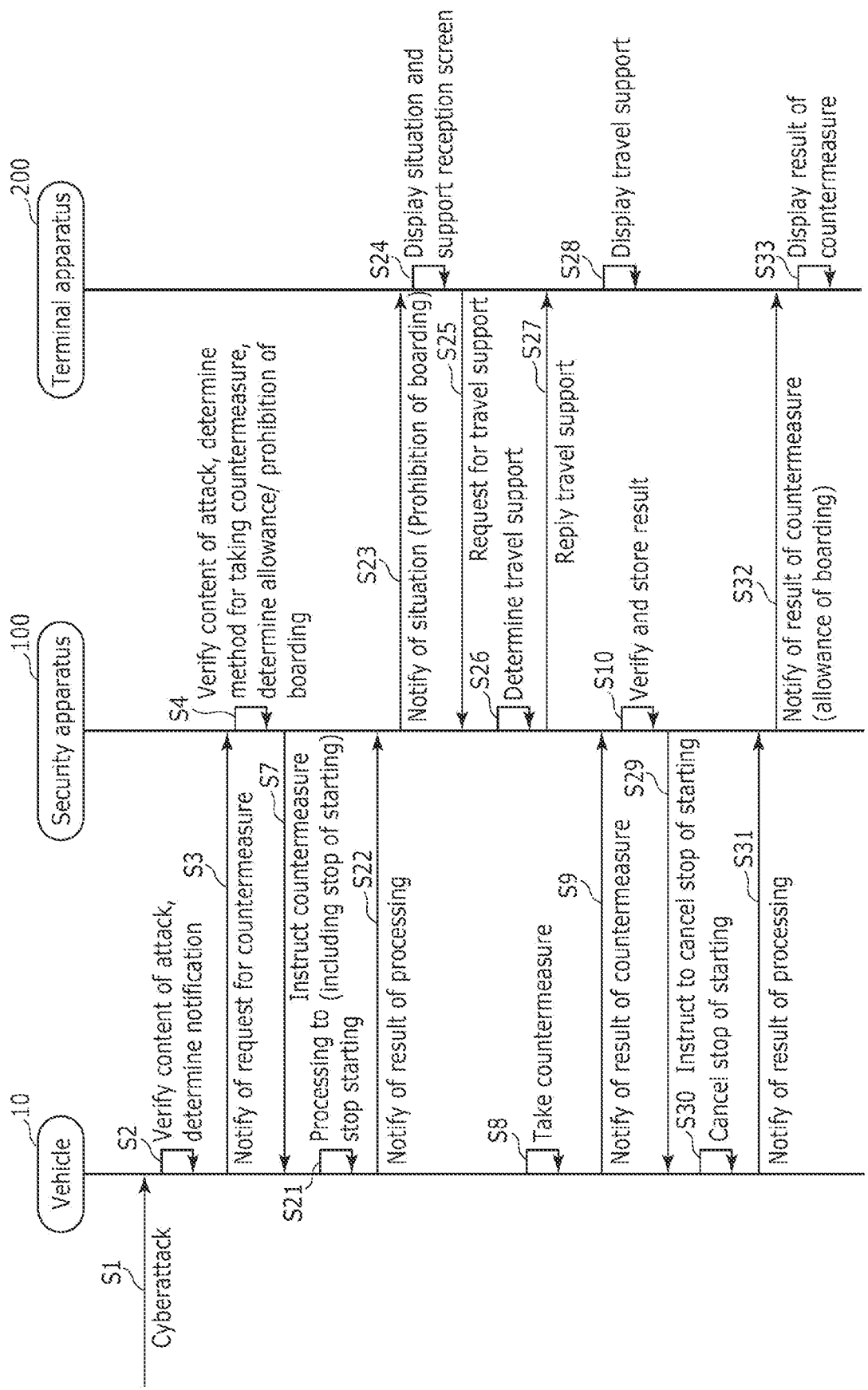
FIG. 9 is a sequence diagram illustrating another example of the processing operation of the security system according to the embodiment.

FIG. 9 is a sequence diagram illustrating another example of the processing operation of security system 1. The processing operation illustrated in FIG. 9 is an operation when vehicle 10 receives a cyberattack while user x is not on board vehicle 10 as in the example illustrated in FIG. 8. In this processing operation, vehicle 10 takes a countermeasure against the cyberattack based on an instruction by security apparatus 100. Unlike the example illustrated in FIG. 8, terminal apparatus 200 is notified of prohibition of boarding.

Specifically, as in the example illustrated in FIG. 8, vehicle 10 performs the processing operations in steps S1 to S3. When second communicator 115 receives the notification of the request for a countermeasure in step S3, analyzer 135 of security apparatus 100 verifies and analyzes the content of the cyberattack indicated in the request for a countermeasure. Based on the result of analysis of the content of the cyberattack by analyzer 135, countermeasure instructor 136 determines the method for taking the countermeasure against the cyberattack. Here, the method for taking the countermeasure includes not only restoration of the program but also stop of starting of vehicle 10. Based on the result of analysis of the content of the cyberattack by analyzer 135 and the method for taking the countermeasure determined by countermeasure instructor 136, boarding determiner 131 determines whether user x is allowed to board vehicle 10 (step S4). Here, unlike the example illustrated in FIG. 8, boarding determiner 131 determines prohibition of boarding.

For example, when the cyberattack causes significant damage and it takes a long time to take a countermeasure against it, boarding determiner 131 determines prohibition of boarding. The degree of damage may be the number of ECUs which receive the cyberattack, or may be identified according to the type of the ECU or a device which receives the cyberattack. The time needed for the countermeasure may be identified by the method for taking the countermeasure. For example, a longer time may be identified as the data amount of the patch to be applied is larger. When the degree of damage is greater than or equal to a threshold and the time needed for the countermeasure is longer than or equal to a threshold, boarding determiner 131 may determine that user x is prohibited to board vehicle 10, that is, boarding is prohibited.

Countermeasure instructor 136 of security apparatus 100 instructs vehicle 10 to take the countermeasure by the method for taking the countermeasure (step S7). Specifically, countermeasure instructor 136 transmits a command signal of stopping starting of vehicle 10, a patch, and a command signal of restoring the program based on the patch to vehicle 10 through second communicator 115. When first communicator 15 receives the patch and the command signal, gateway 16 of vehicle 10 first causes an ECU that controls the engine or the motor, among ECUs 11 to 14, to stop starting of vehicle 10 (step S21). Specifically, gateway 16 causes the ECU to prohibit driving of the engine or the motor to prevent vehicle 10 from starting or traveling. Furthermore, gateway 16 notifies security apparatus 100 of the result of processing performed according to the command signal of stopping the starting through first communicator 15 (step S22). Subsequently, gateway 16 restores the program using the patch transmitted from security apparatus 100. Specifically, vehicle 10 takes the countermeasure by the method for taking the countermeasure determined by countermeasure instructor 136 (step S8). When the countermeasure is completed, gateway 16 notifies security apparatus 100 of the result of the countermeasure through first communicator 15 (step S9).

After the processing of step S4, notification processor 133 of security apparatus 100 notifies terminal apparatus 200 of the situation of vehicle 10 through second communicator 115 (step S23). The notification performed in step S23 may be performed only by the above-mentioned normal notification, or may be performed by the normal notification and an additional notification. The situation of vehicle 10 includes the cyberattack performed on vehicle 10 and nonallowance of boarding of vehicle 10, that is, prohibition of boarding. Specifically, notification processor 133 transmits a situation notification image to terminal apparatus 200 by an e-mail, the situation notification image indicating that vehicle 10 receives a cyberattack and user x is prohibited to board vehicle 10. Here, because user x is prohibited to board vehicle 10, the situation notification image also includes a support reception image for receiving support from other transportation means. The support reception image specifically indicates a plurality of transportation means such as a taxi, a loaner car, and public transportation, and is an image for receiving support from any one of these transportation means.

When third communicator 215 receives the notification in step S23, controller 201 of terminal apparatus 200 displays a situation notification image on display 241, the situation notification image indicating the situation of vehicle 10 notified (step S24). Specifically, the image indicating the situation of vehicle 10 and the support reception image are displayed. At this time, controller 201 further causes output of the warning sound and vibration of terminal apparatus 200 to be executed by controlling loudspeaker 242 and vibrator 243. Because the situation of vehicle 10 notified includes prohibition of boarding, the sound volume of the warning sound and the vibration of terminal apparatus 200 at this time may be larger than the sound volume and the vibration in step S6 of FIG. 8. User x grasps by seeing the situation notification image that vehicle 10 receives a cyberattack and user x is prohibited to board vehicle 10. Furthermore, user x selects one desired transportation means from the plurality of transportation means indicated by the support reception image. For example, user x selects a taxi as the transportation means. This selection is performed by an input operation to input device 244. When such selection is performed, controller 201 requests support of the selected transportation means from security apparatus 100 through third communicator 215 (step S25).

When second communicator 115 accepts the request of support by the transportation means, notification processor 133 of security apparatus 100 refers to travel support list information b2 stored in database 134. From travel support list information b2, notification processor 133 then determines travel support information corresponding to the requested transportation means (step S26). For example, notification processor 133 determines the company name, the address, the location, the telephone number, the e-mail address, and the URL associated with support ID "SP-001" in travel support list information b2 as the travel support information. Notification processor 133 then transmits the determined travel support information to terminal apparatus 200 through second communicator 115 (step S27). When third communicator 215 receives the travel support information, controller 201 of terminal apparatus 200 displays the travel support information on display 241 (step S28).

When second communicator 115 receives the notification in step S9, notification processor 133 of security apparatus 100 verifies the result of the countermeasure in step S8, and stores information indicating the result of the countermeasure in database 134, for example (step S10). Countermeasure instructor 136 then transmits a command signal of cancelling the stop of starting of vehicle 10 to vehicle 10 through second communicator 115 (step S29). Specifically, countermeasure instructor 136 instructs vehicle 10 to cancel the stop of start. When first communicator 15 receives the command signal, gateway 16 of vehicle 10 causes the ECU that is operating according to the command signal of stopping the starting to cancel the stop of the starting (step S30). Specifically, the prohibition of the starting is canceled. Furthermore, gateway 16 notifies security apparatus 100 of the result of processing performed according to the command signal of cancelling the stop of start, through first communicator 15 (step S31).

When second communicator 115 receives the notification in step S31, notification processor 133 of security apparatus 100 notifies terminal apparatus 200 of the result of the countermeasure through second communicator 115 (step S32). Specifically, notification processor 133 transmits an e-mail indicating the result of the countermeasure to the e-mail address of user x. The result of the countermeasure includes allowance of boarding of vehicle 10. When third communicator 215 receives the notification in step S32, controller 201 of terminal apparatus 200 displays an image indicating the result of the countermeasure on display 241 as the countermeasure result image (step S33).

As in the example illustrated in FIG. 9, countermeasure instructor 136 according to the present embodiment instructs vehicle 10 to stop the starting of vehicle 10 in the instruction of the countermeasure against the cyberattack. Thereby, the starting of vehicle 10 is not performed, and therefore travel of vehicle 10 different from the intention of user x can be suppressed to enhance safety. Furthermore, when the countermeasure against the cyberattack is taken in vehicle 10, countermeasure instructor 136 instructs vehicle 10 to cancel the stop of starting of vehicle 10. Thereby, the stop of starting of vehicle 10 is canceled after the countermeasure against the cyberattack is taken, and therefore travel of vehicle 10 as intended by user x can be implemented while safety is ensured.

Figure 10:
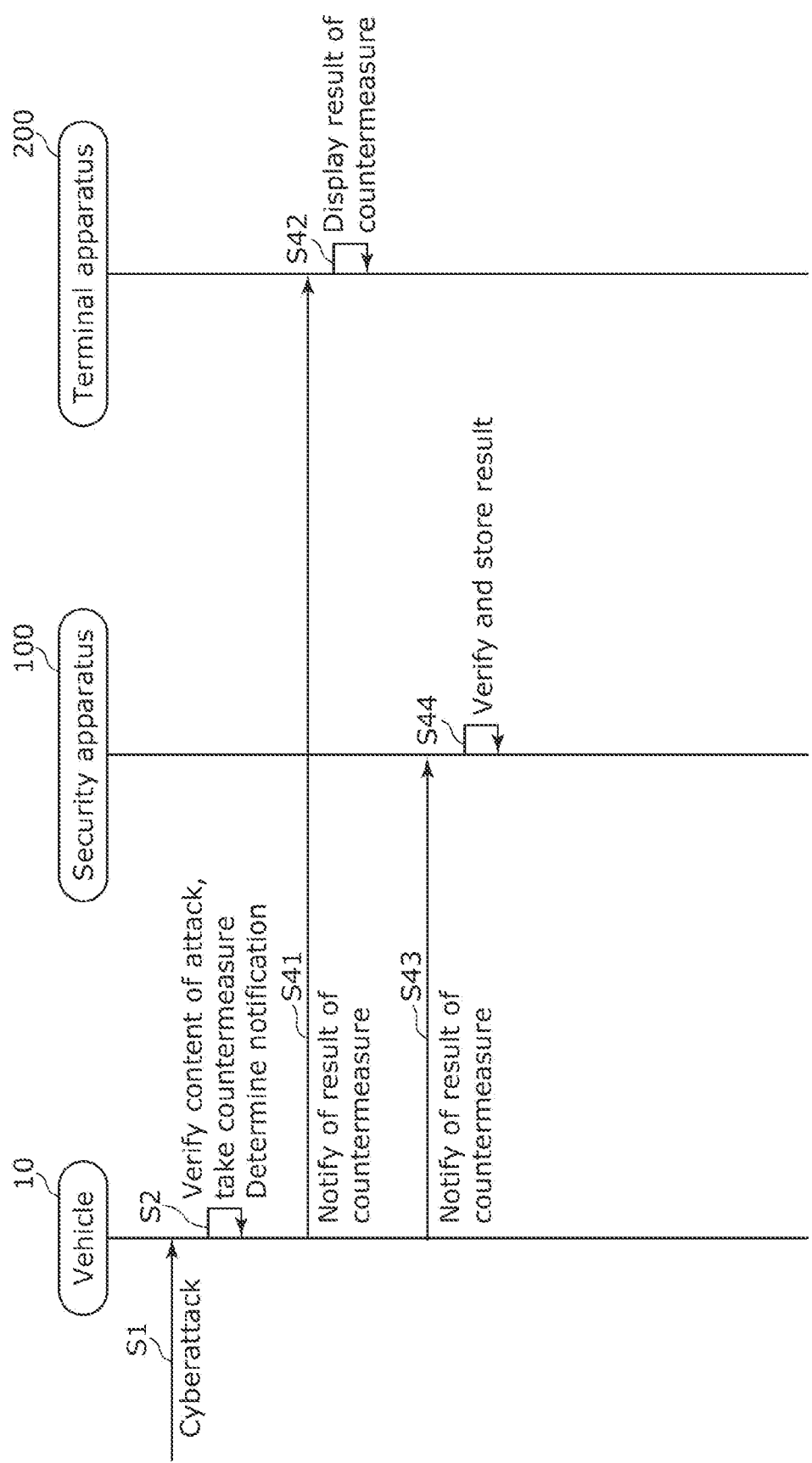
FIG. 10 is a sequence diagram illustrating further another example of the processing operation of the security system according to the embodiment.

FIG. 10 is a sequence diagram illustrating another example of the processing operation of security system 1. As in the examples illustrated in FIGS. 8 and 9, the processing operation illustrated in FIG. 10 is an operation when vehicle 10 receives a cyberattack while user x is not on board vehicle 10. Unlike the examples illustrated in FIGS. 8 and 9, in this processing operation, vehicle 10 takes a countermeasure against the cyberattack without receiving an instruction from security apparatus 100, and terminal apparatus 200 is notified of allowance of boarding.

Specifically, first, vehicle 10 receives a cyberattack (step S1). Gateway 16 of vehicle 10 detects the cyberattack, and verifies the content of the cyberattack. Based on the content of the cyberattack, gateway 16 determines that a countermeasure against the cyberattack can be taken only by vehicle 10 without receiving an instruction from security apparatus 100, and takes the countermeasure. Furthermore, gateway 16 determines security apparatus 100 and terminal apparatus 200 as destinations for notification of the result of the countermeasure (step S2). For example, the result of the countermeasure indicates that vehicle 10 has received a cyberattack, the countermeasure against the cyberattack has been performed, and user x is allowed to board vehicle 10.

Next, gateway 16 notifies terminal apparatus 200 as the destination for notification determined in step S2 of the result of the countermeasure through first communicator 15 (step S41). When third communicator 215 receives the notification in step S41, controller 201 of terminal apparatus 200 displays an image indicating the result of the countermeasure on display 241 as the countermeasure result image (step S42).

Furthermore, gateway 16 notifies security apparatus 100 as the destination for notification determined in step S2 of the result of the countermeasure through first communicator 15 (step S43). When second communicator 115 receives the notification in step S43, notification processor 133 of security apparatus 100 verifies the result of the countermeasure, and stores information indicating the result of the countermeasure in database 134, for example (step S44).

Although terminal apparatus 200 is notified of allowance of boarding in the example illustrated in FIG. 10, terminal apparatus 200 may be notified of prohibition of boarding. In this case, vehicle 10 notifies terminal apparatus 200 of the situation of vehicle 10 including prohibition of boarding before notifying terminal apparatus 200 of the result of the countermeasure including allowance of boarding.

Figure 11:
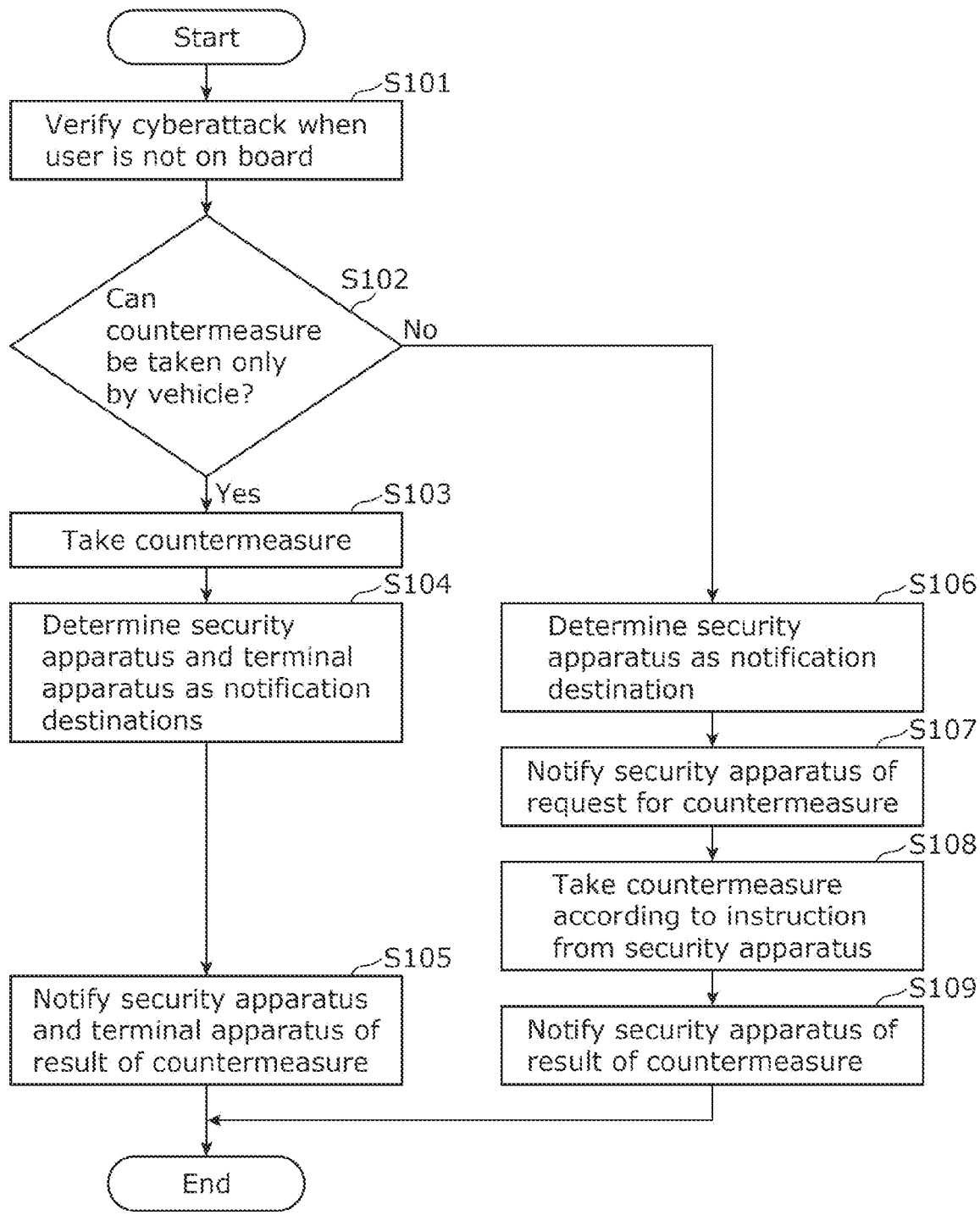
FIG. 11 is a flowchart illustrating one example of the processing operation of the vehicle according to the embodiment.

FIG. 11 is a flowchart illustrating one example of the processing operation of vehicle 10. Specifically, the flowchart illustrated in FIG. 11 illustrates one example of the processing operation of gateway 16.

First, gateway 16 verifies a cyberattack when user x is not on board vehicle 10 (step S101). For example, gateway 16 detects reception of a cyberattack when at least one of ECU 11, 12, 13, or 14 determines that user x is not on board vehicle 10.

Based on the content of the cyberattack, gateway 16 determines that the countermeasure against the cyberattack can be taken only by vehicle 10 without receiving an instruction from security apparatus 100 (step S102). Here, when gateway 16 determines that the countermeasure against the cyberattack can be taken only by vehicle 10 (Yes in step S102), gateway 16 takes the countermeasure against the cyberattack (step S103), and determines security apparatus 100 and terminal apparatus 200 as the destinations for notification of the result of the countermeasure (step S104). Gateway 16 then notifies security apparatus 100 and terminal apparatus 200 as the determined destinations for notification of the result of the countermeasure through first communicator 15 (step S105).

In contrast, when gateway 16 determines that the countermeasure against the cyberattack cannot be taken only by vehicle 10 (No in step S102), gateway 16 determines only security apparatus 100 as the destination for notification (step S106). Gateway 16 then notifies security apparatus 100 as the determined destination for notification of a request for a countermeasure through first communicator 15 (step S107).

Furthermore, gateway 16 takes the countermeasure against the cyberattack according to the instruction from security apparatus 100 after the processing in step S107 (step S108), and notifies security apparatus 100 of the result of the countermeasure through first communicator 15 (step S109).

Figure 12:
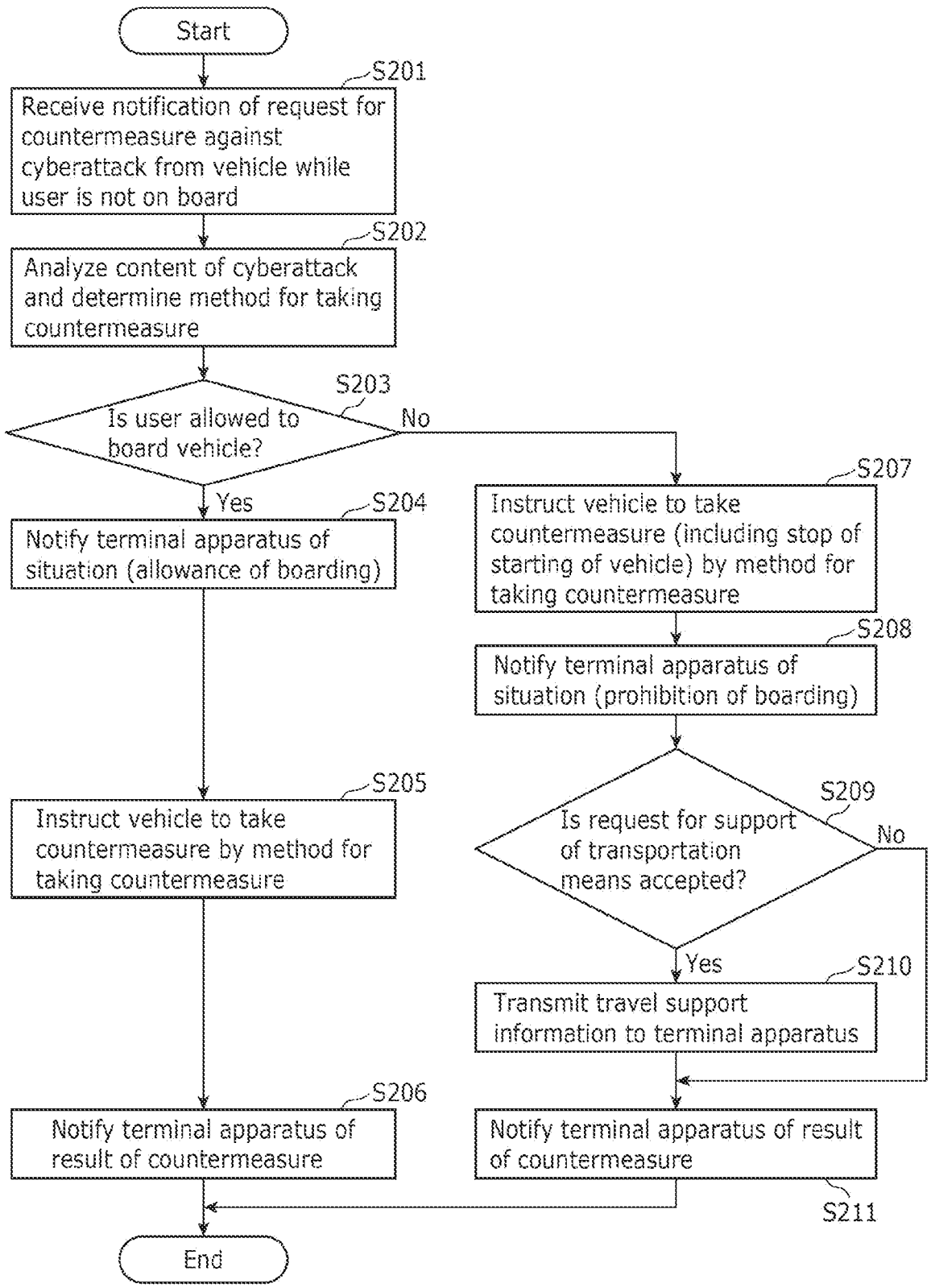
FIG. 12 is a flowchart illustrating one example of the processing operation of the security apparatus according to the embodiment.

FIG. 12 is a flowchart illustrating one example of the processing operation of security apparatus 100.

When user x is not on board vehicle 10, second communicator 115 of security apparatus 100 receives notification from vehicle 10 (step S201), the notification being a request for a countermeasure against a cyberattack. Analyzer 135 verifies and analyzes the content of the cyberattack indicated by the notification, and based on the result of analysis, countermeasure instructor 136 determines the method for taking a countermeasure against the cyberattack (step S202). Based on the result of analysis of the cyberattack and the determined method for taking the countermeasure, boarding determiner 131 determines whether user x is allowed to board vehicle 10 (step S203). Because the request for a countermeasure indicates the boarding situation of vehicle 10, boarding determiner 131 can grasp that user x is not on board vehicle 10, and can determine whether user x is allowed to board vehicle 10.

Here, when it is determined by boarding determiner 131 that user x is allowed to board (Yes in step S203), notification processor 133 notifies terminal apparatus 200 of the situation of vehicle 10 through second communicator 115 (step S204). Specifically, a notification that vehicle 10 has received a cyberattack but user x is allowed to board vehicle 10 is transmitted to terminal apparatus 200. Furthermore, countermeasure instructor 136 instructs vehicle 10 through second communicator 115 to take the countermeasure by the method for taking the countermeasure determined in step S202 (step S205). Notification processor 133 then notifies terminal apparatus 200 of the result of the countermeasure through second communicator 115 (step S206).

In contrast, when it is determined by boarding determiner 131 that user x is prohibited to board (No in step S203), countermeasure instructor 136 instructs vehicle 10 through second communicator 115 to take the countermeasure by the method for taking the countermeasure determined in step S202 (step S207). This countermeasure may include not only restoration of the program but also the stop of starting of vehicle 10. Notification processor 133 then notifies terminal apparatus 200 of the situation of vehicle 10 through second communicator 115 (step S208). Specifically, a notification that vehicle 10 has received a cyberattack and user x is prohibited to board vehicle 10 is transmitted to terminal apparatus 200. This notification may be performed by the situation notification image including the above-mentioned support reception image.

Furthermore, after the notification in step S208 is performed, notification processor 133 determines whether second communicator 115 accepts the request for support by the transportation means (step S209). Here, when notification processor 133 determines that second communicator 115 accepts the request (Yes in step S209), notification processor 133 transmits the travel support information according to the request to terminal apparatus 200 through second communicator 115 (step S210). When notification processor 133 determines that second communicator 115 does not accept the request for support by the transportation means (No in step S209) or after the transmission in step S210 is performed, terminal apparatus 200 is notified of the result of the countermeasure through second communicator 115 (step S211). When a countermeasure including the stop of starting of vehicle 10 is instructed in step S207, countermeasure instructor 136 instructs vehicle 10 to cancel the stop of the starting after the countermeasure is taken and before the processing in step S211 is performed.

Figure 13:
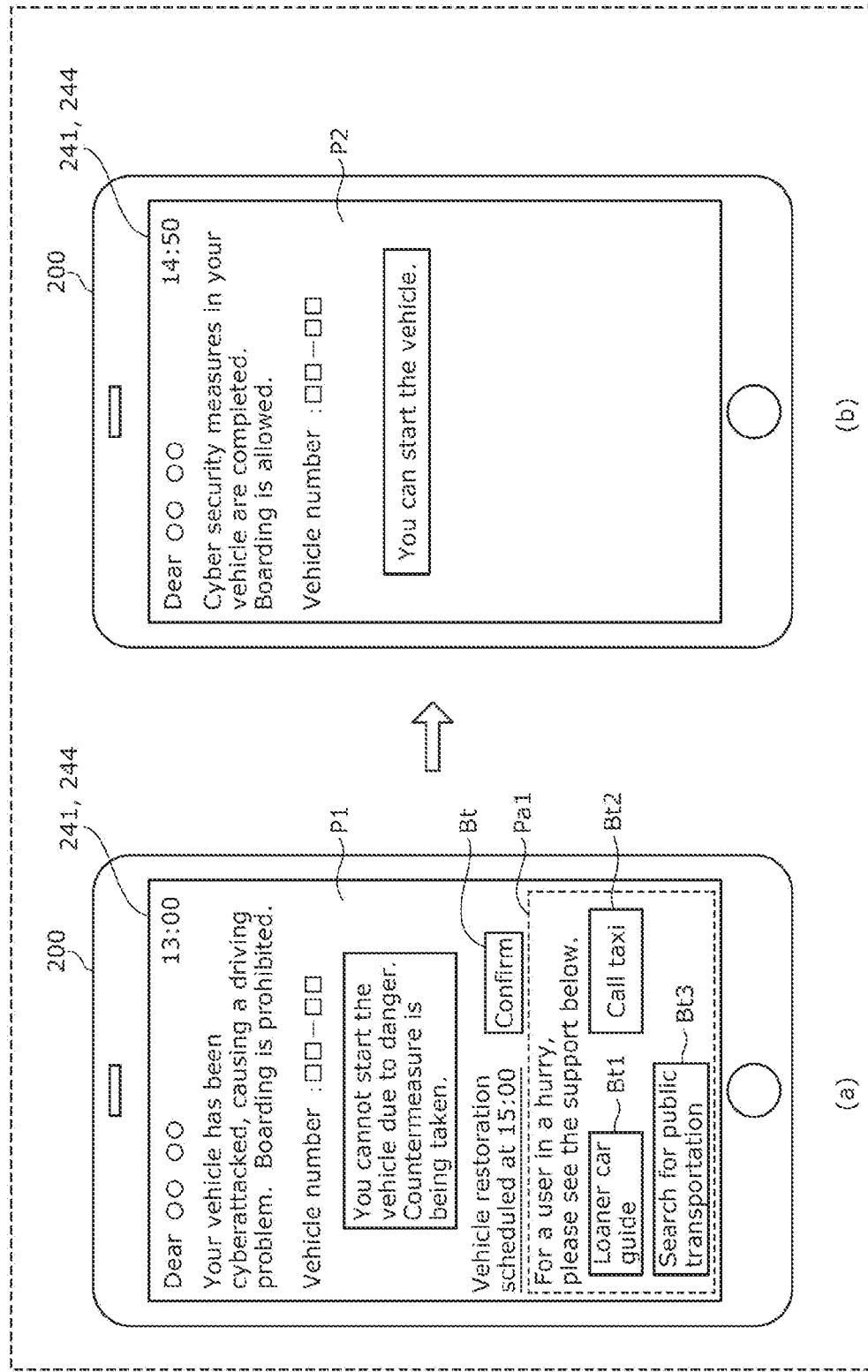
FIG. 13 is a diagram illustrating one example of a situation notification image and a countermeasure result image according to the embodiment.

FIG. 13 is a diagram illustrating one example of the situation notification image and the countermeasure result image. The situation notification image and the countermeasure result image in FIG. 13 are images displayed when the countermeasure against the cyberattack cannot be taken only by vehicle 10 and prohibition of boarding is determined.

For example, notification processor 133 of security apparatus 100 notifies terminal apparatus 200 of the situation of vehicle 10 which receives a cyberattack. In response to the notification, as illustrated in (a) of FIG. 13, terminal apparatus 200 displays situation notification image P1 on display 241. Such situation notification image P1 is displayed in step S24 illustrated in FIG. 9.

Situation notification image P1 shows that vehicle 10 has received a cyberattack, driving currently has a problem, boarding of vehicle 10 is prohibited, the vehicle number of vehicle 10, starting of vehicle 10 is stopped, a countermeasure is being taken, and the vehicle restoration time scheduled. Situation notification image P1 also includes support reception image Pa1.

Specifically, based on the result of analysis by analyzer 135 and the result of determination by boarding determiner 131, notification processor 133 grasps that boarding of vehicle 10 is prohibited and driving currently has a problem. Furthermore, notification processor 133 identifies the vehicle number of vehicle 10 by referring to vehicle information a2 in second account device 117. Furthermore, notification processor 133 grasps the method for taking the countermeasure determined by countermeasure instructor 136, and calculates the vehicle restoration time scheduled by the method for taking the countermeasure. Notification processor 133 then generates situation notification image P1 described above, situation notification image P1 indicating the grasped, identified, and calculated information. Notification processor 133 causes support reception image Pa1 to be included in situation notification image P1 when the vehicle restoration time scheduled is a time ahead a predetermined time from the current time. The predetermined time may be 1 minute, or may be 5 or 10 minutes. It need not be limited to these. The predetermined time may be 0 minutes.

Support reception image Pa1 includes buttons Bt1, Bt2, and Bt3 for accepting support by the transportation means. When button Bt1 is selected by an input operation to input device 244 by user x, controller 201 of terminal apparatus 200 requests support for arrangement of a loaner car from security apparatus 100 through third communicator 215. In this case, notification processor 133 refers to travel support list information b2 in database 134, and identifies the information associated with support ID "SP-002" as the travel support information. In other words, information such as company name "LMN Designated Driver Service", address "aaa", and telephone number "ccc" is identified as the travel support information. Notification processor 133 transmits the travel support information to terminal apparatus 200 through second communicator 115. Thereby, the travel support information is displayed on display 241 of terminal apparatus 200.

When button Bt2 is selected by an input operation to input device 244 by user x, controller 201 of terminal apparatus 200 requests support of a taxi from security apparatus 100 through third communicator 215. In this case, notification processor 133 refers to travel support list information b2 in database 134, and identifies the information associated with support ID "SP-001" as the travel support information. In other words, the information such as company name "ABC Taxi", address "RRR", and telephone number "TTT" is identified as the travel support information. Notification processor 133 transmits the travel support information to terminal apparatus 200 through second communicator 115. Thereby, the travel support information is displayed on display 241 of terminal apparatus 200.

When button Bt3 is selected by an input operation to input device 244 by user x, controller 201 of terminal apparatus 200 requests support of public transportation from security apparatus 100 through third communicator 215. In this case, notification processor 133 refers to travel support list information b2 in database 134, and identifies the information associated with support ID "SP-003" as the travel support information. In other words, information such as company name "XYZ Guide" and URL "fff" is identified as the travel support information. Notification processor 133 transmits the travel support information to terminal apparatus 200 through second communicator 115. Thereby, the URL such as a guide for transfer by public transportation is displayed on display 241 of terminal apparatus 200 as the travel support information.

As described above, when the prohibition of boarding is determined as the result of determination by boarding determiner 131, notification processor 133 according to the present embodiment notifies terminal apparatus 200 of the travel support information concerning a transportation means other than vehicle 10. Thereby, terminal apparatus 200 is notified of the travel support information, and therefore, user x can easily get the information concerning the transportation means other than vehicle 10 from terminal apparatus 200. As a result, user x can travel using the transportation means other than vehicle 10 without boarding vehicle 10. Accordingly, such a configuration can support travel of user x. Specifically, notification processor 133 notifies terminal apparatus 200 of the travel support information concerning the transportation means selected from the plurality of transportation means in response to the input operation to terminal apparatus 200 by user x. Thereby, user x can select a desired transportation means by the input operation, and can easily get the information concerning the selected transportation means. Accordingly, such a configuration can further support travel of user x.

Here, situation notification image P1 further includes button Bt. Button Bt is a button for transmitting the abovementioned answerback signal, and is a so-called confirmation button for notifying security apparatus 100 that the situation of vehicle 10 is confirmed. When button Bt is selected by an input operation to input device 244 by user x, controller 201 of terminal apparatus 200 transmits an answerback signal to security apparatus 100 through third communicator 215. Thereby, the above-mentioned additional notification continuously performed is stopped.

When countermeasure against the cyberattack in vehicle 10 is completed, notification processor 133 of security apparatus 100 notifies terminal apparatus 200 of the result of the countermeasure through second communicator 115. In response to the notification, as illustrated in (b) of FIG. 13, terminal apparatus 200 displays countermeasure result image P2 on display 241. Such countermeasure result image P2 is displayed in step S33 of FIG. 9. Countermeasure result image P2 shows that the countermeasure against the cyberattack in vehicle 10 is completed, boarding is allowed, the vehicle number of vehicle 10, and the starting of vehicle 10 is allowed.

Figure 14:
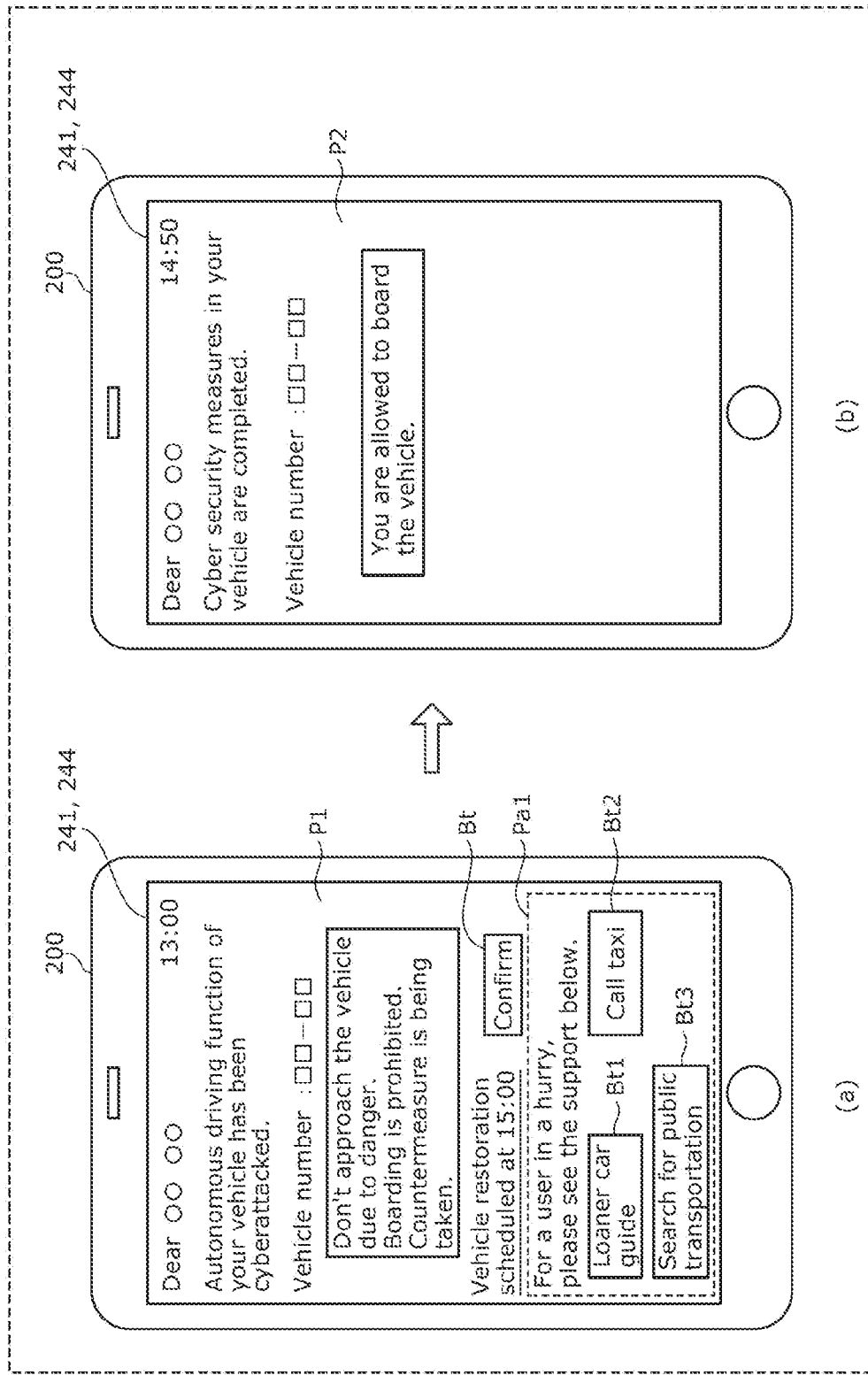
FIG. 14 is a diagram illustrating another example of the situation notification image and the countermeasure result image according to the embodiment.

FIG. 14 is a diagram illustrating another example of the situation notification image and the countermeasure result image. As in the example in FIG. 13, the situation notification image and the countermeasure result image illustrated in FIG. 14 are images when the countermeasure against the cyberattack cannot be taken only by vehicle 10 and prohibition of boarding is determined. In the example illustrated in FIG. 14, vehicle 10 has an autonomous driving function. Thus, when a cyberattack is performed on the autonomous driving function, there is a possibility that vehicle 10 travels on its own irrespective of the intention of user x. Even when vehicle 10 receives a command signal of stopping the start, vehicle 10 may travel.

In such a case, in response to the notification of the situation of vehicle 10 from security apparatus 100, terminal apparatus 200 displays situation notification image P1 illustrated in (a) of FIG. 14 on display 241. Such situation notification image P1 is displayed in step S24 of FIG. 9. Situation notification image P1 illustrated in (a) of FIG. 14 shows that the autonomous driving function of vehicle 10 has received a cyberattack, user x is prohibited to approach vehicle 10 due to danger, boarding of vehicle 10 is prohibited, and a countermeasure is being taken, with the vehicle number of vehicle 10 and the vehicle restoration time scheduled. Situation notification image P1 includes support reception image Pa1 as in the example illustrated in FIG. 13.

Specifically, based on the result of analysis by analyzer 135, notification processor 133 grasps that the cyberattack target is the autonomous driving function of vehicle 10 and user x is prohibited to approach vehicle 10 due to danger. Furthermore, based on the result of determination by boarding determiner 131, notification processor 133 grasps that boarding of vehicle 10 is prohibited. Notification processor 133 then generates situation notification image P1 described above, situation notification image P1 indicating the grasped information. This situation notification image P1 includes button Bt and support reception image Pa1 as in the example illustrated in FIG. 13.

When the countermeasure against the cyberattack in vehicle 10 is completed, notification processor 133 of security apparatus 100 notifies terminal apparatus 200 of the result of the countermeasure through second communicator 115. In response to the notification, as illustrated in (b) of FIG. 14, terminal apparatus 200 displays countermeasure result image P2 on display 241. Such countermeasure result image P2 is displayed in step S33 of FIG. 9. This countermeasure result image P2 shows that the countermeasure against the cyberattack in vehicle 10 is completed and boarding is allowed, with the vehicle number of vehicle 10.

When the cyberattack is performed on the autonomous driving function of vehicle 10, countermeasure instructor 136 of security apparatus 100 may prohibit to unlock all the doors of vehicle 10 as one countermeasure against the cyberattack. This can effectively prevent user x from boarding vehicle 10 in danger.

Figure 15:
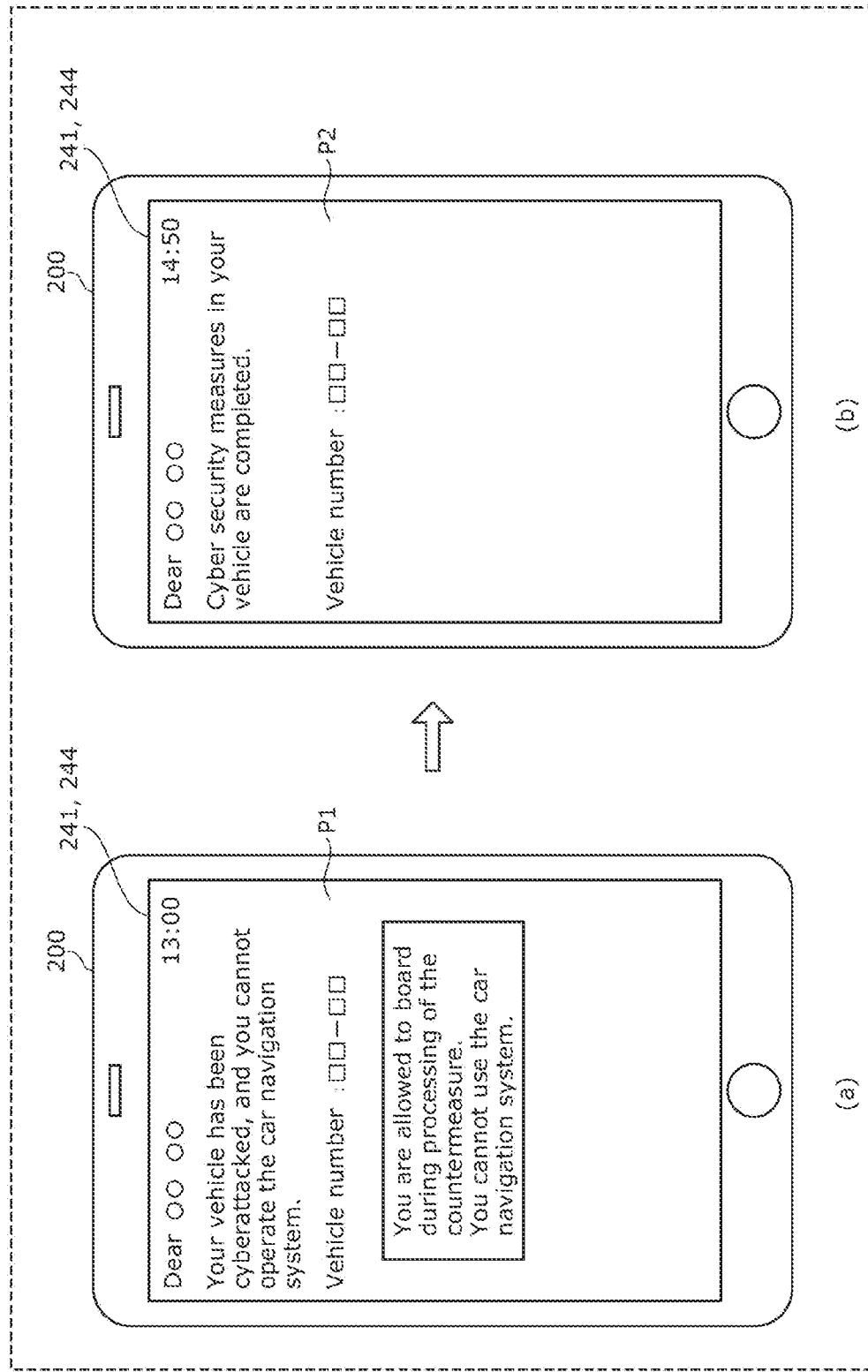
FIG. 15 is a diagram illustrating another example of the situation notification image and the countermeasure result image according to the embodiment.

FIG. 15 is a diagram illustrating another example of the situation notification image and the countermeasure result image. The situation notification image and the countermeasure result image in FIG. 15 are images displayed when allowance of boarding is determined even when the countermeasure against the cyberattack cannot be taken only by vehicle 10. In the example illustrated in FIG. 15, a car navigation apparatus (hereinafter, also referred to as car navigation system) provided with vehicle 10 has received a cyberattack. The cyberattack against the car navigation system does not cause a problem in the drive control function of vehicle 10. The drive control function indicates functions to run, turn, and stop. It can also be said that damage due to the cyberattack against the car navigation system is small or influences on the drive control function caused by the cyberattack against the car navigation system are small. Thus, when the cyberattack is performed on the car navigation system, user x may board vehicle 10.

Then, notification processor 133 of security apparatus 100 notifies terminal apparatus 200 that user x is allowed to board, as the situation of vehicle 10 which has received the cyberattack. In response to the notification, as illustrated in (a) of FIG. 15, terminal apparatus 200 displays situation notification image P1 on display 241. Such situation notification image P1 is displayed in step S6 of FIG. 8. As illustrated in (a) of FIG. 15, situation notification image P1 shows that vehicle 10 has received a cyberattack, user x cannot operate the car navigation system of vehicle 10, and user x is allowed to board vehicle 10, with the vehicle number of vehicle 10.

Specifically, based on the result of analysis by analyzer 135, notification processor 133 grasps that a cyberattack was performed on the car navigation system and user x cannot operate the car navigation system. Furthermore, based on the result of determination by boarding determiner 131, notification processor 133 grasps that user x is allowed to board vehicle 10 because the influences on the drive control function caused by the cyberattack are small. Furthermore, notification processor 133 identifies the vehicle number of vehicle 10. Notification processor 133 then generates situation notification image P1 described above, situation notification image P1 indicating the grasped and identified information.

When the countermeasure against the cyberattack in vehicle 10 is completed, notification processor 133 of security apparatus 100 notifies terminal apparatus 200 of the result of the countermeasure through second communicator 115. In response to the notification, as illustrated in (b) of FIG. 15, terminal apparatus 200 displays countermeasure result image P2 on display 241. Such countermeasure result image P2 is displayed in step S12 of FIG. 8. Countermeasure result image P2 shows that the countermeasure against the cyberattack in vehicle 10 is completed, with the vehicle number of vehicle 10.

Situation notification image P1 and countermeasure result image P2 illustrated in FIG. 15 may also be displayed when the countermeasure against the cyberattack is taken only by vehicle 10 without receiving an instruction from security apparatus 100. In other words, before the countermeasure in the processing in step S2 of FIG. 10 is taken, vehicle 10 may notify terminal apparatus 200 of the situation of vehicle 10, and terminal apparatus 200 may display situation notification image P1 illustrated in (a) of FIG. 15 in response to the notification. In step S42 of FIG. 10, terminal apparatus 200 may display countermeasure result image P2 illustrated in (b) of FIG. 15.

FIG. 16 is a diagram illustrating another example of the situation notification image and the countermeasure result image. The situation notification image and the countermeasure result image illustrated in FIG. 16 are images displayed when allowance of boarding is determined even when the countermeasure against the cyberattack cannot be taken only by vehicle 10, as in the example illustrated in FIG. 15. In the example illustrated in FIG. 16, the odograph provided in vehicle 10 has received a cyberattack. The odograph is an apparatus that records and presents the distance which vehicle 10 travels. The cyberattack against the odograph does not cause a problem in the drive control function of vehicle 10. It can also be said that damage due to the cyberattack against the odograph is small or influences on the drive control function caused by the cyberattack against the odograph are small. Thus, user x may board vehicle 10 when the cyberattack is performed on the odograph.

Then, notification processor 133 of security apparatus 100 notifies terminal apparatus 200 that user x is allowed to board, as the situation of vehicle 10 which has received the cyberattack. In response to the notification, as illustrated in (a) of FIG. 16, terminal apparatus 200 displays situation notification image P1 on display 241. Such situation notification image P1 is displayed in step S6 of FIG. 8. As illustrated in (a) of FIG. 16, situation notification image P1 shows that vehicle 10 has received a cyberattack, the traveling distance presented is not correct, and user x is allowed to board vehicle 10, with the vehicle number of vehicle 10.

Specifically, based on the result of analysis by analyzer 135, notification processor 133 grasps that the cyberattack was performed on the odograph and the odograph presents a wrong traveling distance. Furthermore, based on the result of determination by boarding determiner 131, notification processor 133 grasps that user x is allowed to board vehicle 10 because the influences on the drive control function caused by the cyberattack are small. Furthermore, notification processor 133 identifies the vehicle number of vehicle 10. Notification processor 133 then generates situation notification image P1 described above, situation notification image P1 indicating the grasped and identified information.

When the countermeasure against the cyberattack in vehicle 10 is completed, notification processor 133 of security apparatus 100 notifies terminal apparatus 200 of the result of the countermeasure through second communicator 115. In response to the notification, as illustrated in (b) of FIG. 16, terminal apparatus 200 displays countermeasure result image P2 on display 241. Such countermeasure result image P2 is displayed in step S12 of FIG. 8. Countermeasure result image P2 may be the same image as that in the example illustrated in (b) of FIG. 15, or may be different from the image.

Situation notification image P1 and countermeasure result image P2 illustrated in FIG. 16 may also be displayed when the countermeasure against the cyberattack is taken only by vehicle 10 without receiving an instruction from security apparatus 100, as in the example illustrated in FIG. 15. In other words, before the countermeasure in the processing in step S2 of FIG. 10 is taken, vehicle 10 may notify terminal apparatus 200 of the situation of vehicle 10, and terminal apparatus 200 may display situation notification image P1 illustrated in (a) of FIG. 16 in response to the notification. In step S42 of FIG. 10, terminal apparatus 200 may display countermeasure result image P2 illustrated in (b) of FIG. 16.

FIG. 17 is a diagram illustrating another example of the situation notification image and the countermeasure result image. The situation notification image and the countermeasure result image illustrated in FIG. 17 are images displayed when allowance of boarding is determined even when the countermeasure against the cyberattack cannot be taken only by vehicle 10, as in the examples illustrated in FIGS. 15 and 16. In the example illustrated in FIG. 17, the door of vehicle 10 is unlocked by the cyberattack. The cyberattack against the door lock does not cause a problem in the drive control function of vehicle 10. It can also be said that damage due to the cyberattack against the door lock is small or influences on the drive control function caused by the cyberattack against the door lock are small. Thus, user x may board vehicle 10 when the cyberattack is performed on the door lock.

Then, notification processor 133 of security apparatus 100 notifies terminal apparatus 200 that user x is allowed to board, as the situation of vehicle 10 which has received the cyberattack. In response to the notification, as illustrated in (a) of FIG. 17, terminal apparatus 200 displays situation notification image P1 on display 241. Such situation notification image P1 is displayed in step S6 of FIG. 8. As illustrated in (a) of FIG. 17, situation notification image P1 shows that vehicle 10 has received the cyberattack, the door is unlocked, user x is allowed to board vehicle 10, and user x need to check the door lock of vehicle 10 immediately, with the vehicle number of vehicle 10. Furthermore, situation notification image P1 include security-related contact image Pa2. Contact image Pa2 shows that security-related organizations are notified of damage due to the cyberattack and pieces of information concerning the organizations. The pieces of information concerning the organizations includes the name (i.e., company name), the telephone number, and the e-mail address of the organization.

Specifically, based on the result of analysis by analyzer 135, notification processor 133 grasps that the cyberattack was performed on the door lock, and the door is unlocked. Furthermore, based on the result of determination by boarding determiner 131, notification processor 133 grasps that user x is allowed to board vehicle 10 because the influences on the drive control function caused by the cyberattack are small. Furthermore, notification processor 133 grasps the vehicle number of vehicle 10. Notification processor 133 then generates situation notification image P1 described above, situation notification image P1 indicating the grasped and identified information. Furthermore, notification processor 133 refers to contact information a3 in second account device 117 to generate contact image Pa2 indicating all or part of pieces of contact information a3, and causes contact image Pa2 to be included in situation notification image P1.

When the countermeasure against the cyberattack in vehicle 10 is completed, notification processor 133 of security apparatus 100 notifies terminal apparatus 200 of the result of the countermeasure through second communicator 115. In response to the notification, as illustrated in (b) of FIG. 17, terminal apparatus 200 displays countermeasure result image P2 on display 241. Such countermeasure result image P2 is displayed in step S12 of FIG. 8. Countermeasure result image P2 may be the same image as that in the examples illustrated in (b) of FIG. 15 and (b) of FIG. 16, or may be different from the image therein.

Situation notification image P1 and countermeasure result image P2 illustrated in FIG. 17 may also be displayed when the countermeasure against the cyberattack is taken only by vehicle 10 without receiving an instruction from security apparatus 100, as in the examples illustrated in FIGS. 15 and 16. In other words, before the countermeasure in the processing in step S2 of FIG. 10 is taken, vehicle 10 may notify terminal apparatus 200 of the situation of vehicle 10, and terminal apparatus 200 may display situation notification image P1 illustrated in (a) of FIG. 17 in response to the notification. In step S42 of FIG. 10, terminal apparatus 200 may display countermeasure result image P2 illustrated in (b) of FIG. 17.

As described above, security apparatus 100 according to the present embodiment determines whether user x is allowed to board vehicle 10 when vehicle 10 receives a cyberattack while user x is not on board. Security apparatus 100 then notifies terminal apparatus 200 of the result of determination whether user x is allowed to board, terminal apparatus 200 being located outside vehicle 10 and used by user x.

Thereby, when vehicle 10 receives a cyberattack while user x is not on board, it is determined that user x is allowed to board vehicle 10, and terminal apparatus 200 is notified of the result of determination. Thus, if user x carries terminal apparatus 200, user x can easily grasp whether user x is allowed or prohibited to board vehicle 10. This configuration can prevent user x from boarding vehicle 10 in danger which has received the cyberattack. As a result, user x can be appropriately supported.

Although the security apparatus according to the present disclosure has been described based on the above embodiment as above, the present disclosure is not limited to the embodiment. The present disclosure may also cover a variety of modifications of the embodiment conceived and made by persons skilled in the art without departing from the gist of the present disclosure.

For example, in the above embodiment, vehicle 10 determines in step S102 of FIG. 11 whether the countermeasure against the cyberattack can be taken only by vehicle 10. However, instead of vehicle 10, security apparatus 100 may determine whether the countermeasure can be taken only by vehicle 10.

In the above embodiment, the components may be configured with dedicated hardware, or may be implemented by executing software programs suitable for the components. The components may be implemented by a program executor, such as a CPU or a processor, which reads out and executes software programs recorded on a recording medium such as a hard disk or a semiconductor memory. Here, the software programs for implementing vehicle 10 and security apparatus 100 according to the above embodiment are computer programs for causing a computer to execute the steps in the flowcharts illustrated in FIGS. 11 and 12.

The present disclosure also covers the following cases.

(1) At least one of the apparatuses described above is specifically a computer system configured with a microprocessor, a ROM, a RAM, a hard disk unit, a display, a keyboard, and a mouse. The RAM or the hard disk unit stores computer programs. The at least one of the apparatuses achieves the function by the microprocessor operating according to the computer programs. Here, the computer programs each are configured with a combination of command codes indicating instructions to the computer to achieve a predetermined function.

(2) Part or all of the components which constitute the at least one of the apparatuses may be configured with a single system large scale integration (LSI: large scale integrated circuit). The system LSI is an ultra multi-functional LSI manufactured by integrating a plurality of constituent parts into a single chip, and is specifically a computer system having a configuration including a microprocessor, a ROM, and a RAM. The RAM stores computer programs. The system LSI achieves the function by the microprocessor operating according to the computer programs.

(3) Part or all of the components which constitute the at least one of the apparatuses may be configured with an IC card or a single module which is attachable to/detachable from the apparatus. The IC card or the module is a computer system configured with a microprocessor, a ROM, and a RAM. The IC card or the module may include the above-mentioned ultra multi-functional LSI. The IC card or module achieves the function by the microprocessor operating according to the computer programs. The IC card or the module may have tamper proofness.

(4) The present disclosure may be the methods described above. Alternatively, the present disclosure may be computer programs for implementing these methods by a computer, or may be digital signals configured of computer programs.

Alternatively, the present disclosure may be computer programs or digital signals recorded on a computer-readable recording medium, such as a flexible disc, a hard disk, a CD (Compact Disc)-ROM, a DVD, a DVD-ROM, a DVD-RAM, a BD (Blu-ray(registered trademark) Disc), or a semiconductor memory. Alternatively, the present disclosure may be digital signals recorded on these recording media.

Alternatively, the present disclosure may be computer programs or digital signals transmitted through an electric communication line, a wireless or wired communication line, a network such as the Internet, or data broadcasting.

Alternatively, the present disclosure may be implemented by another independent computer system by transporting programs or digital signals recorded on a recording medium or transporting programs or digital signals through a network.

While various embodiments have been described herein above, it is to be appreciated that various changes in form and detail may be made without departing from the spirit and scope of the present disclosure as presently or hereafter claimed.

FURTHER INFORMATION ABOUT
TECHNICAL BACKGROUND TO THIS
APPLICATION

The disclosure of the following patent application including specification, drawings, and claims are incorporated herein by reference in their entirety: Japanese Patent Application No. 2022-195467 filed on Dec. 7, 2022.

INDUSTRIAL APPLICABILITY

The security apparatus according to the present disclosure is applicable to apparatuses or systems which take countermeasures against cyberattacks to vehicles, for example.

The invention claimed is:

1. A security apparatus comprising:
circuitry; and
memory connected to the circuitry,
wherein using the memory, the circuitry:
determines whether a user is allowed or prohibited to board a vehicle when the vehicle receives a cyberattack while the user is not on board the vehicle; and
notifies a terminal apparatus of a result of determination whether the user is allowed or prohibited to board the vehicle, the terminal apparatus being located outside the vehicle and used by the user.

2. The security apparatus according to claim 1,
wherein the circuitry further notifies the terminal apparatus of travel support information concerning a transportation means other than the vehicle when prohibition of boarding is determined as the result of determination.

3. The security apparatus according to claim 2,
wherein in the notification of the travel support information, the circuitry notifies the terminal apparatus of the travel support information concerning the transportation means selected by an input operation to the terminal apparatus by the user among a plurality of transportation means.

4. The security apparatus according to claim 1,
wherein the circuitry further instructs the vehicle to take a countermeasure against the cyberattack which the vehicle received, when the prohibition of boarding is determined as the result of determination.

5. The security apparatus according to claim 4,
wherein in the instruction of the countermeasure against the cyberattack, the circuitry instructs the vehicle to stop starting of the vehicle.

6. The security apparatus according to claim 5,
wherein the circuitry further instructs the vehicle to cancel the stop of starting of the vehicle when the countermeasure against the cyberattack is taken in the vehicle.

7. The security apparatus according to claim 1,
wherein when the prohibition of boarding is determined as the result of determination, the circuitry identifies a distance between the terminal apparatus and the vehicle, and changes a notification mode for notification of the prohibition of boarding according to the distance.

8. The security apparatus according to claim 7,
wherein the notification mode is expressed by at least one of a sound output from the terminal apparatus or vibration of the terminal apparatus, and
the circuitry changes the notification mode according to the distance to increase the at least one of the sound or the vibration with a decrease in the distance.

9. The security apparatus according to claim 1,
wherein when the prohibition of boarding is determined as the result of determination, the circuitry identifies an elapsed time from the determination of the prohibition of boarding, and changes a notification mode for continuous notification of the prohibition of boarding according to the elapsed time.

10. The security apparatus according to claim 9,
wherein the notification mode is expressed by at least one of a sound output from the terminal apparatus or vibration of the terminal apparatus, and
the circuitry changes the notification mode according to the elapsed time to increase the at least one of the sound or the vibration with an increase in the elapsed time.

11. The security apparatus according to claim 9,
wherein the notification mode is expressed by a cycle of at least one of a sound repeatedly output from the terminal apparatus or vibration of the terminal apparatus repeatedly occurring, and
the circuitry changes the notification mode according to the elapsed time to shorten the cycle with an increase in the elapsed time.

12. The security apparatus according to claim 7,
wherein the circuitry stops continuously-performed notification of the prohibition of boarding in the notification mode in response to an answerback signal from the terminal apparatus.

13. The security apparatus according to claim 1,
wherein when the prohibition of boarding is determined as the result of determination, the circuitry further notifies another terminal apparatus of the result of determination, the another terminal apparatus being different from the terminal apparatus.

14. The security apparatus according to claim 7,
wherein the circuitry continuously identifies the distance between the terminal apparatus and the vehicle at a plurality of timings, and changes the notification mode at each of the plurality of timings according to the distance identified at the timing.

15. The security apparatus according to claim 4,
wherein as the countermeasure against the cyberattack, the circuitry instructs the vehicle to restore a program altered by the cyberattack.

16. The security apparatus according to claim 15,
wherein when the circuitry instructs the vehicle to restore the program altered, the circuitry transmits a modification program for restoring the program altered, to the vehicle.

17. The security apparatus according to claim 4,
wherein when the circuitry receives a notification of a result of the countermeasure against the cyberattack from the vehicle, the circuitry further causes the terminal apparatus to display the result of the countermeasure by notifying the terminal apparatus of the result of the countermeasure.

18. The security apparatus according to claim 4,
wherein the circuitry further calculates a time when the countermeasure against the cyberattack will be completed as a vehicle restoration time scheduled, and notifies the terminal apparatus of the vehicle restoration time scheduled.

19. A security method performed by a computer, the security method comprising:
determining whether a user is allowed or prohibited to board a vehicle when the vehicle receives a cyberattack while the user is not on board the vehicle; and
notifying a terminal apparatus of a result of determination whether the user is allowed or prohibited to board the vehicle, the terminal apparatus being located outside the vehicle and used by the user.

20. A non-transitory computer-readable recording medium having recorded thereon a program for causing a computer to execute:

determining whether a user is allowed or prohibited to board a vehicle when the vehicle receives a cyberattack while the user is not on board the vehicle; and notifying a terminal apparatus of a result of determination whether the user is allowed or prohibited to board the vehicle, the terminal apparatus being located outside the vehicle and used by the user.

\* \* \* \* \*